United States Patent
Fei et al.

(10) Patent No.: US 11,312,404 B2
(45) Date of Patent: Apr. 26, 2022

(54) DUAL-FUNCTION ELECTRIC STAIR-CLIMBING VEHICLE CAPABLE OF TRANSPORTING GOODS AND ASSISTING PEOPLE

(71) Applicants: Yonghai Fei, Shanghai (CN); Zhenhua Fei, Shanghai (CN)

(72) Inventors: Yonghai Fei, Shanghai (CN); Zhenhua Fei, Shanghai (CN)

( * ) Notice: Subject to any disclaimer, the term of this patent is extended or adjusted under 35 U.S.C. 154(b) by 0 days.

(21) Appl. No.: 16/987,342

(22) Filed: Aug. 6, 2020

(65) Prior Publication Data
US 2021/0024114 A1 Jan. 28, 2021

Related U.S. Application Data

(63) Continuation of application No. PCT/CN2019/105524, filed on Sep. 12, 2019.

(30) Foreign Application Priority Data

Sep. 19, 2018 (CN) .......................... 201811096826.7
Jan. 25, 2019 (WO) ................. PCT/CN2019073163
Aug. 16, 2019 (CN) .......................... 201921337484.3

(51) Int. Cl.
- *B62B 5/02* (2006.01)
- *B60R 16/02* (2006.01)

(52) U.S. Cl.
CPC .............. *B62B 5/028* (2013.01); *B60R 16/02* (2013.01)

(58) Field of Classification Search
CPC ........ A61G 5/065; A61G 5/063; A61G 5/061; B62B 5/023; B62B 5/028; B62B 5/026; B62B 5/02; B60R 16/02

USPC .......................................................... 180/21
See application file for complete search history.

(56) References Cited

U.S. PATENT DOCUMENTS

| | | | | |
|---|---|---|---|---|
| 3,127,188 A | * | 3/1964 | Greub ................... | A61G 5/066 280/5.22 |
| 4,639,004 A | * | 1/1987 | Maeda ................... | B62B 1/002 280/47.2 |
| 5,335,741 A | * | 8/1994 | Rabinovitz ............ | A61G 5/061 180/8.2 |

(Continued)

FOREIGN PATENT DOCUMENTS

| CN | 1180033 A | 4/1998 |
|---|---|---|
| CN | 2873599 Y | 2/2007 |

(Continued)

*Primary Examiner* — Jeffrey J Restifo
*Assistant Examiner* — Hilary L Johns

(57) ABSTRACT

Disclosed a dual-function electric stair-climbing vehicle. A bicycle-like saddle is mounted at an upper part of a frame of the vehicle; and a worm gear reducer is mounted at a middle part of the vehicle for driving two rotating legs to climb up or downstairs. The vehicle is mainly used for fire rescue in high-rise buildings, equipment maintenance of high-rise buildings when no elevator is available, and fast transportation of equipment, materials and firefighters or maintenance men upstairs. When the width of a corridor is greater than 1.1 m, the vehicle can be rode upstairs directly with people and goods; when the width is less than 1.1 m and greater than 0.9 m, people need to get off and make a turn; and when the width is less than 0.9 m, the vehicle is not available. The dimension of the frame is about 1200×550× 380 mm.

6 Claims, 16 Drawing Sheets

(56) References Cited

U.S. PATENT DOCUMENTS

| | | | | |
|---|---|---|---|---|
| 5,605,345 A | * | 2/1997 | Erfurth | A61G 5/08 135/67 |
| 6,845,533 B1 | * | 1/2005 | Tulette | A61G 1/042 280/47.131 |
| 2004/0188960 A1 | * | 9/2004 | Bierma | B62B 5/023 280/5.2 |
| 2008/0251300 A1 | * | 10/2008 | Frankie | A61G 5/061 180/8.2 |
| 2008/0265529 A1 | * | 10/2008 | Kamara | B62B 5/026 280/5.26 |
| 2009/0119844 A1 | * | 5/2009 | Barnett | A61G 13/105 5/622 |
| 2013/0154207 A1 | * | 6/2013 | Sabin | A61G 5/061 280/5.26 |
| 2013/0186698 A1 | | 7/2013 | Sarokhan et al. | |
| 2014/0271095 A1 | * | 9/2014 | Umans | B62B 5/0404 414/800 |
| 2018/0170417 A1 | * | 6/2018 | Casey | B62B 5/026 |

FOREIGN PATENT DOCUMENTS

| | | | | |
|---|---|---|---|---|
| CN | 102602437 A | | 7/2012 | |
| CN | 103832524 A | | 6/2014 | |
| CN | 103963813 A | | 8/2014 | |
| CN | 207550222 U | | 6/2018 | |
| CN | 109017887 A | | 12/2018 | |
| DE | 10342500 A1 | | 4/2005 | |
| DE | 102006049770 A1 | | 5/2008 | |
| DE | 102012105031 A1 | * | 12/2013 | B62B 5/023 |
| GB | 2112330 A | * | 7/1983 | B62D 57/022 |
| WO | WO-2017220546 A1 | * | 12/2017 | A61G 5/061 |

\* cited by examiner ( Positioning and anti-collision structure of slide rail )

A ( Saddle lifting rod )

B

| ( Reinforcing hook ) C | ( Rope hook ) D | ( Wire clamp ) E |

( Chassis of semi-built-in electrical box )

DUAL-FUNCTION ELECTRIC STAIR-CLIMBING VEHICLE CAPABLE OF TRANSPORTING GOODS AND ASSISTING PEOPLE

CROSS-REFERENCE TO RELATED APPLICATIONS

This application is a continuation of International Application No. PCT/CN2019/105524, filed on Sep. 12, 2019, which claims the benefit of priority from Chinese Patent Application No. 201811096826.7, filed on Sep. 19, 2018, and Chinese Patent Application No. 201921337484.3, filed on Aug. 16, 2019. The content of the aforementioned applications, including any intervening amendments thereto, is incorporated herein by reference.

TECHNICAL FIELD

The present invention proposes a novel stair-climbing vehicle, which is mainly used for transporting goods, can carry 120-150 kg of goods, is supplemented by assisting people, can assist people to reduce the leg strength of about 30-40 kg when climbing the stairs, and can also reduce the physical strength for pulling the vehicle horizontally, thereby benefiting follow-up strong physical operations of people after going upstairs.

BACKGROUND OF THE PRESENT INVENTION

In the prior art, the electric stair-climbing vehicles for transporting goods all adopt a single function mode that people walk backwards to pull the vehicle, so people are easy to fall due to low speed, reverse view and backward riding. Because of heavy physical exhaustion, people cannot climb high-rise buildings, thereby affecting follow-up strong physical operations, such as high-rise fire rescue and emergency repair of equipment in case of power failure.

SUMMARY OF THE PRESENT INVENTION

Technical problems to be solved by the present invention are as follows:
1. People adopt a control mode of riding forward.
2. The stair-climbing vehicle has dual functions of mainly transporting goods and assisting about 30-40 kg of lifting force for people at the same time.
3. The reliability of horizontal thrust of the vehicle is improved to reduce the physical strength of people again.
4. The circuit has innovative design, fewer but better switches, multiple functions, easy operation and simple artificial intelligence.
5. A function of fixed low speed is added to reach a set speed accurately by making a simple turn. A fixed speed is the condition of accurately controlling the vehicle.
6. When stopping at a low speed, the range of stopping angles of rotating legs can be set by proximity switches, which is convenient for starting next time.
7. In case of sudden accidents or artificial needs, the vehicle can be powered off automatically and braked immediately to minimize the accidents.
8. An anti-collision function is added to allow a small amount of operation errors without damaging the stair-climbing vehicle.
9. A red light is provided for warning misoperation before starting to go up and downstairs to ensure safety.
10. An innovative structure for assisting people to ride should be reasonable, simple, practical and attractive.

B is a schematic diagram of a saddle-lifting solid column;

C is a schematic diagram of a reinforcing hook of a slide rail pressing plate;

D is a schematic diagram of a rope hook; and

E is a structural schematic diagram of a wire clamp of a control bus.

Figure 13:
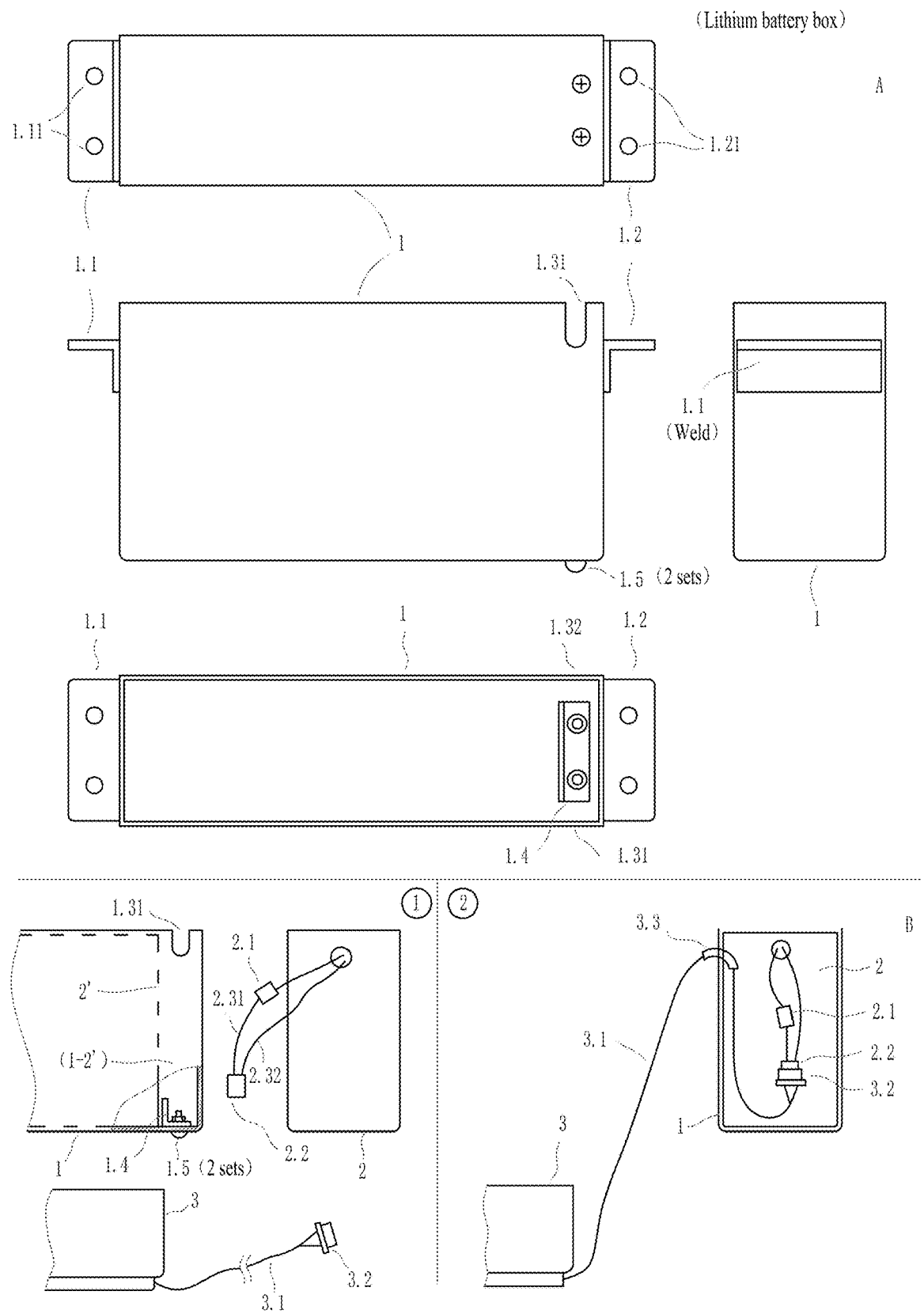
Figure 14:
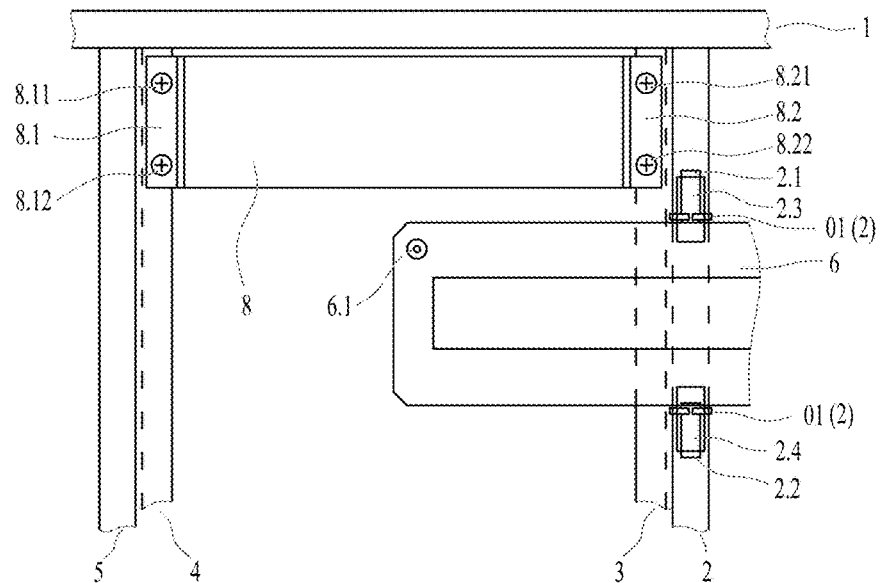
Figure 14:
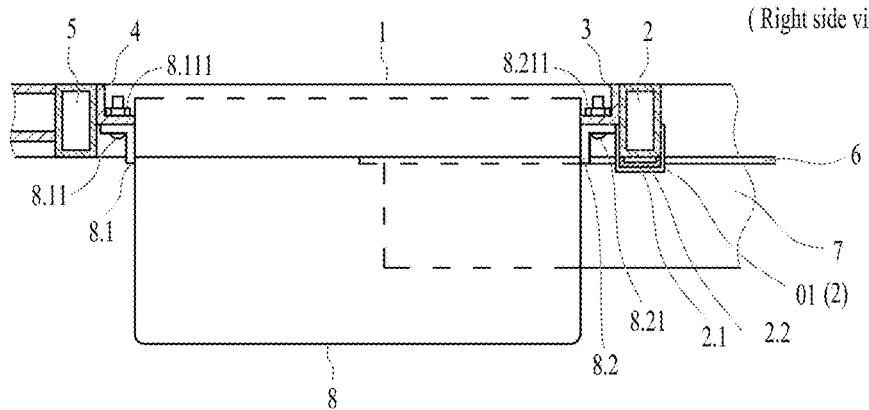
Figure 14:
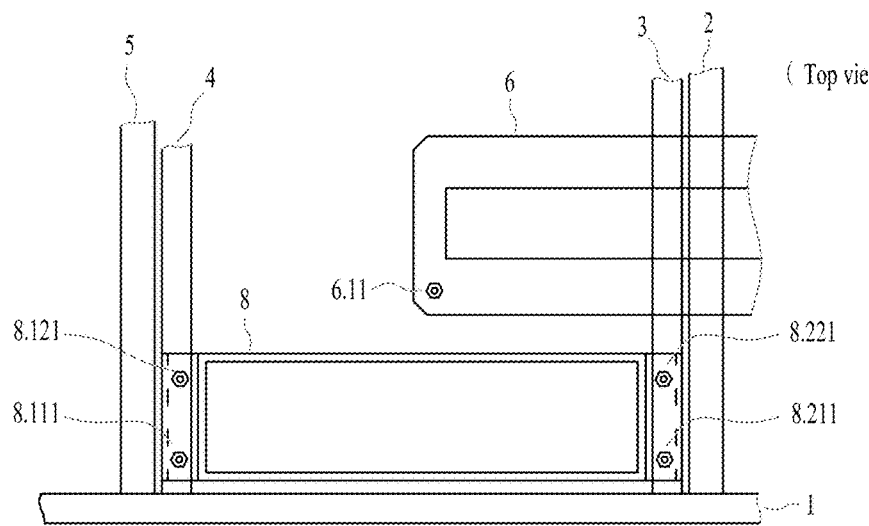
Figure 15:
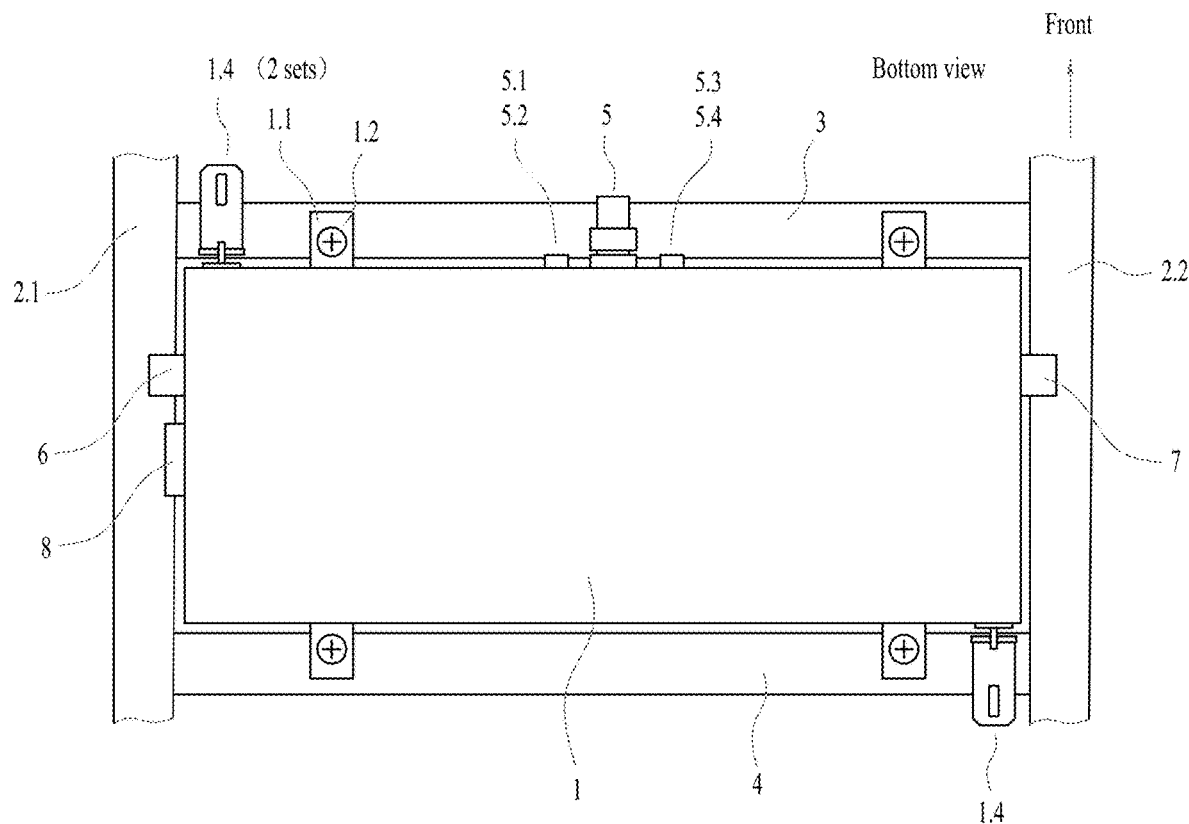
Figure 15:
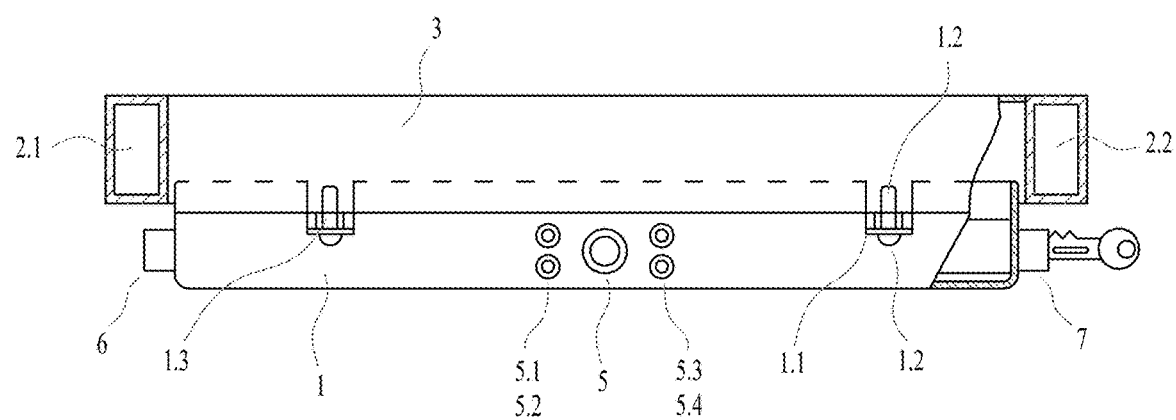
Figure 16:
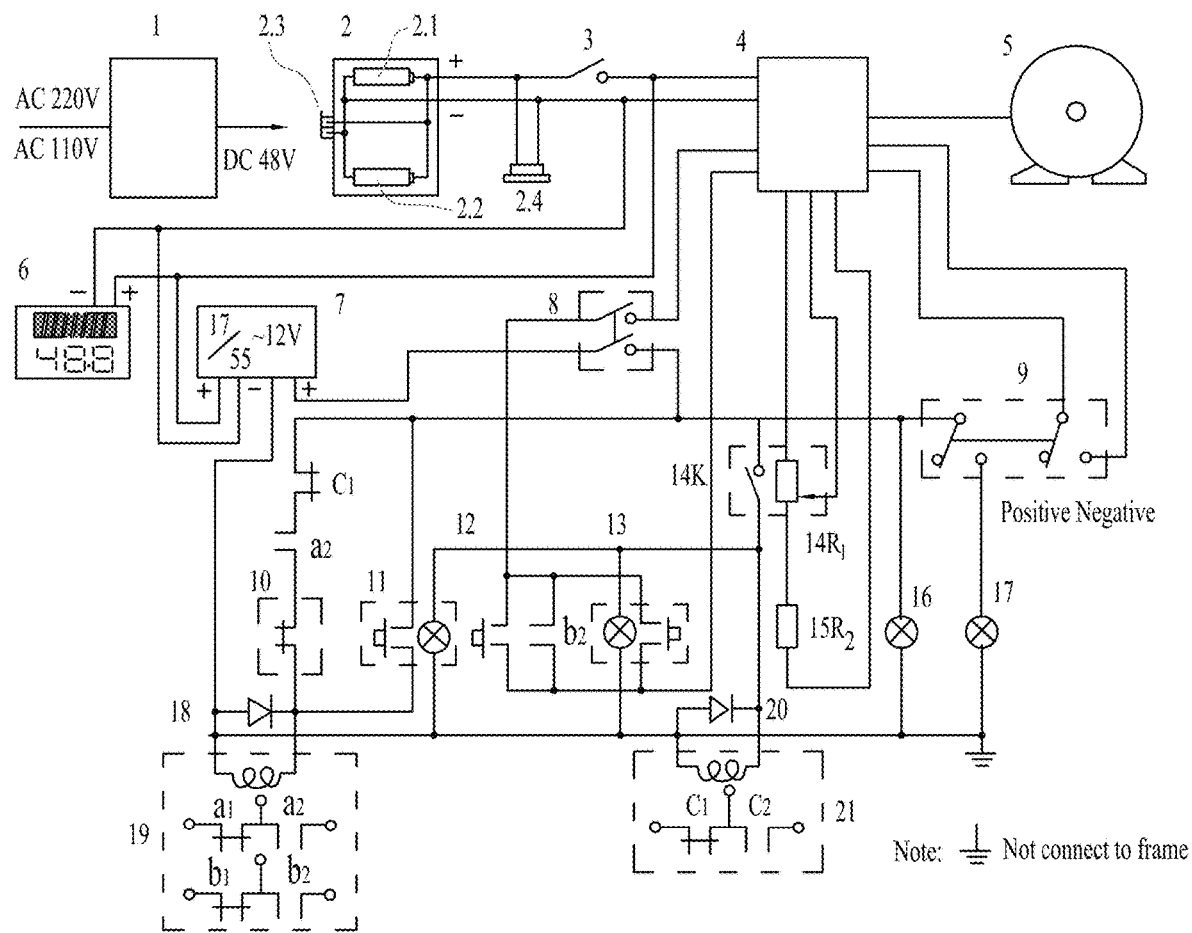

FIG. 13: A is a structural schematic diagram of a box body of a lithium battery box; and B is a wiring schematic diagram of finished lithium batteries, lithium battery boxes and electrical boxes purchased in a market;

FIG. 14 is a schematic diagram of a mounting mode of a right lithium battery box. Upper figure is a bottom view; middle figure is a right view; and lower figure is a top view;

FIG. 15 is a schematic diagram of a structure and a mounting and connection mode of a semi-built-in electrical box; and FIG. 16 is a wiring schematic diagram of a circuit.

DETAILED DESCRIPTION OF THE PRESENT INVENTION

Figure 1:
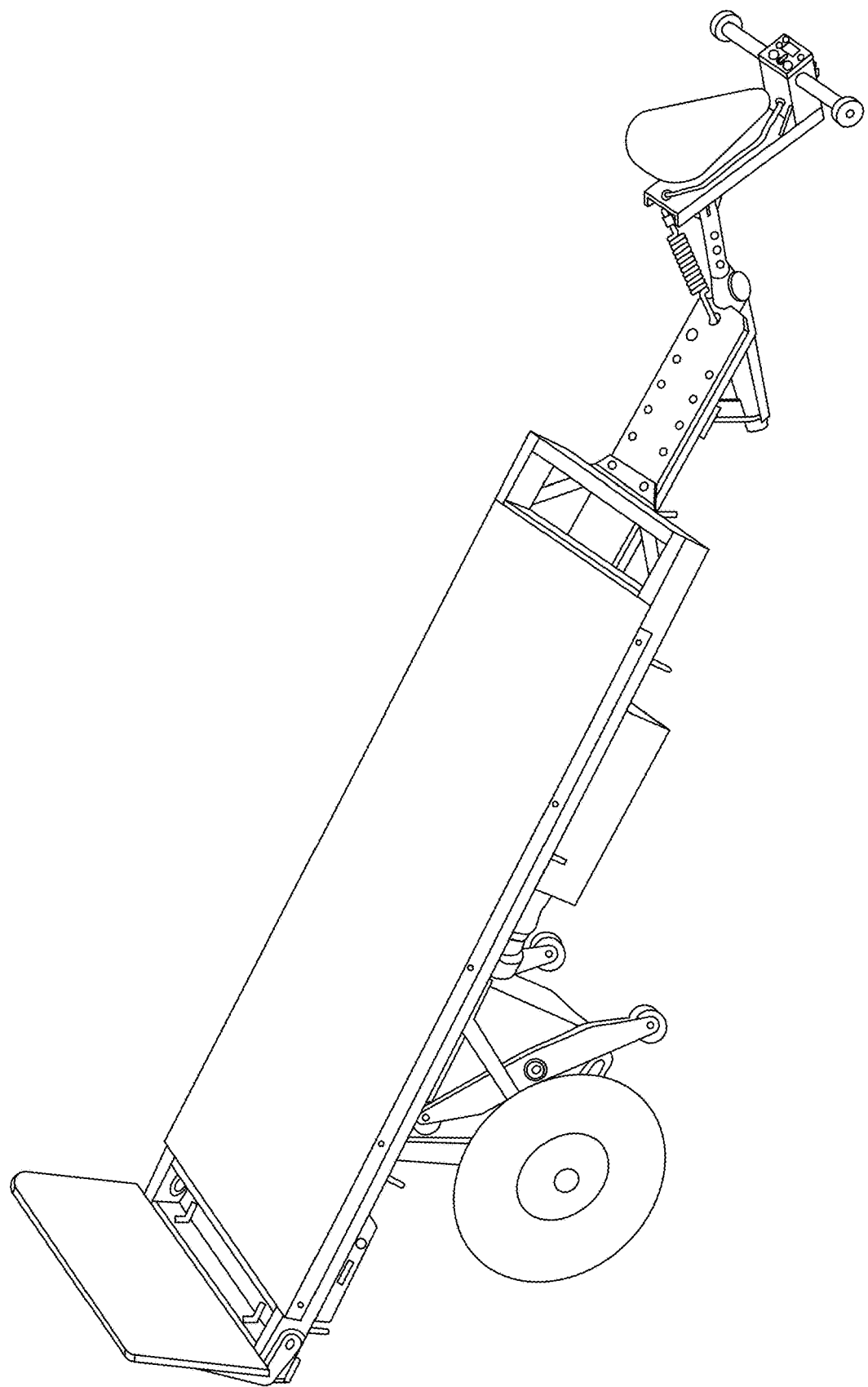
FIG. 1 is an external view of a right oblique upper side of a whole vehicle.
Figure 2:
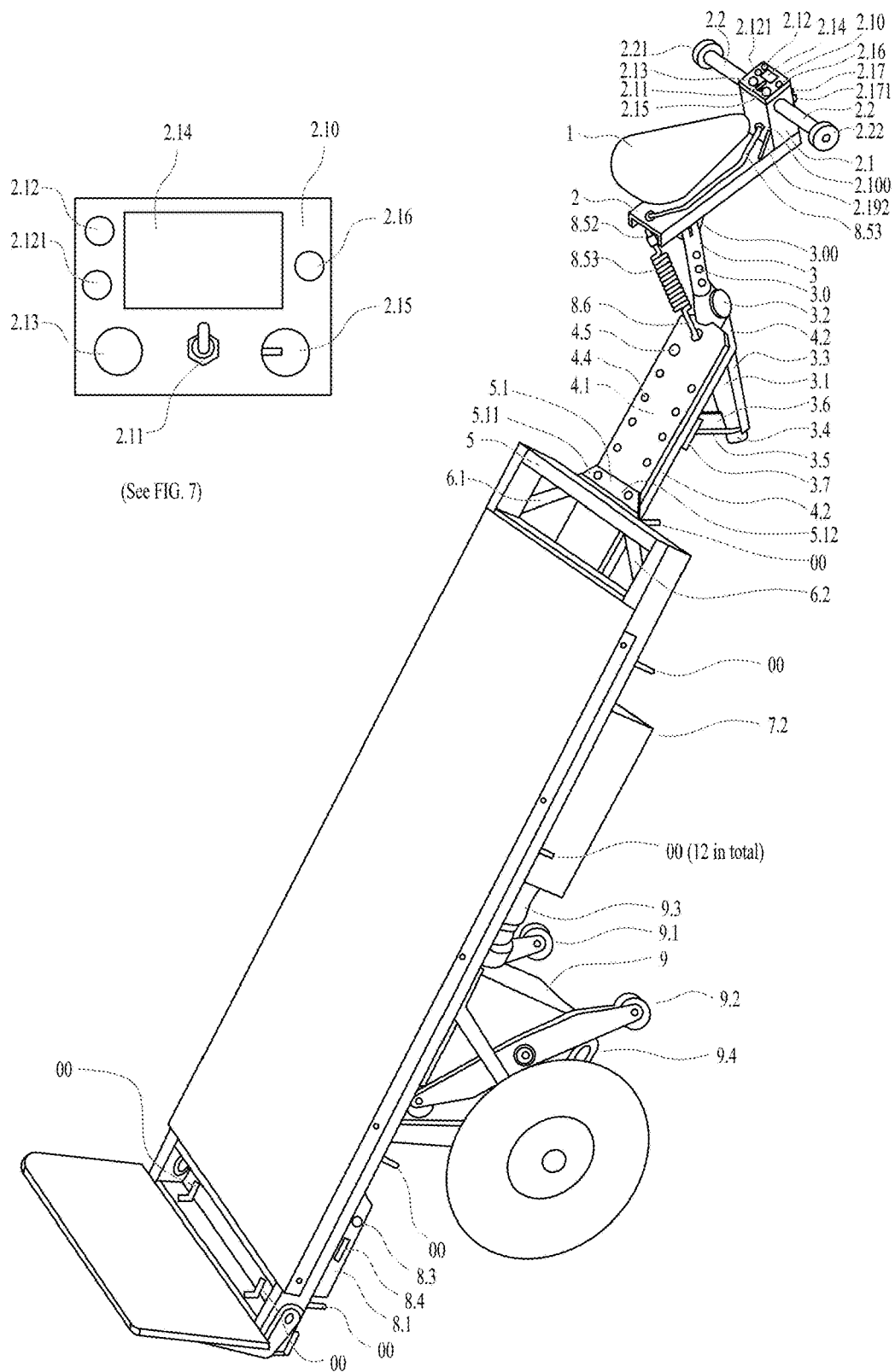
FIG. 2 is a diagram of mark numbers of various parts on a right oblique upper side of a whole vehicle.
Figure 3:
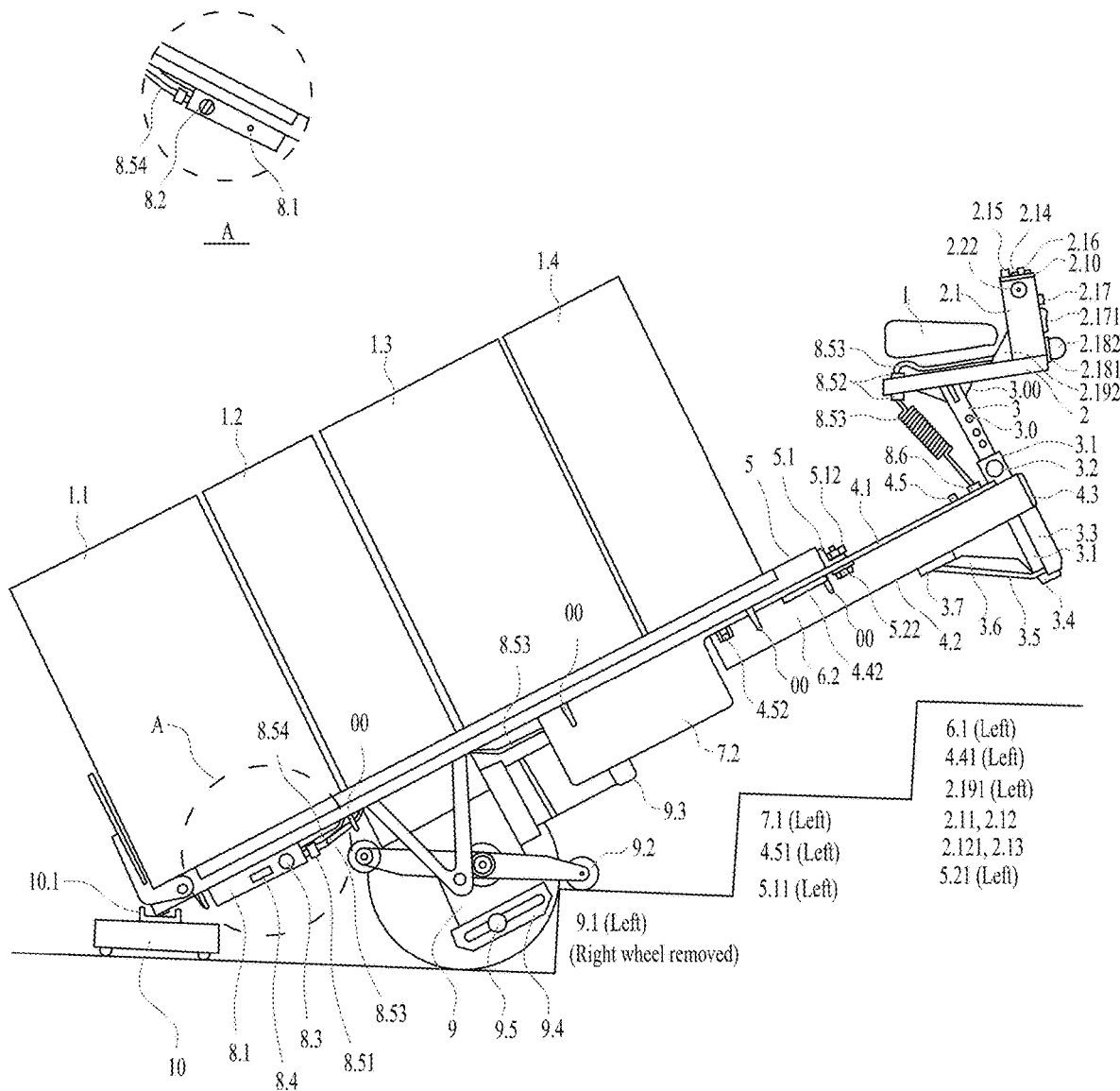
FIG. 3 shows a diagram of mark numbers of various parts on a right side of a whole vehicle and a schematic diagram of a setting mode of a lifting force.

1. Mode for People to Climb the Stairs by Riding Forward:

A dual-function electric stair-climbing vehicle capable of transporting goods and assisting people comprises a vehicle body, rotating legs, a saddle, a front of the vehicle and an electric control platform, wherein when the rotating legs of a stair-climbing vehicle climb up the stair steps, a rolling wheel at a front end part becomes a temporary central fulcrum and forms a seesaw principle with the center of gravity of the whole vehicle and the center of gravity of people, thereby having a lifting force for people, which is set as 30-40 kg. The rotating legs have the lifting force for people and also have reliable horizontal thrust structures, so that the rolling wheels cannot rotate and roll automatically when climbing the stairs. The electric stair-climbing vehicle capable of transporting goods and assisting people has the lifting force and the reliable horizontal thrust for a ride man so that the man can ride forward to control the vehicle; the tilting, lifting and back-and-forth of the saddle can be adjusted; and however, all other electric stair-climbing vehicles for transporting goods adopt a single function mode that people walk backwards to pull the vehicle. A soft bicycle saddle is mounted in front of a stair-climbing vehicle; and the front of the vehicle is low and small (FIG. 2 and FIG. 3: 1, 2.1, 2.2, 3), so that people can ride forward and control the vehicle. The electric control platform is arranged in front of the saddle (FIG. 2 and FIG. 3: 2.10). People can control the vehicle to go upstairs by holding front handles with both hands, keeping pressing a switch with the thumb of a left hand, and controlling a speed regulation knob (FIG. 2 and FIG. 3: 2.2, 2.13, 215; and FIG. 7: 2, 7, 10) by the fingers of a right hand, and can stop the vehicle by releasing the thumb of the left hand. A complete driving method will be described later.

2. Control Switch and Functional Features:

The dual-function electric stair-climbing vehicle capable of transporting goods and assisting people comprises the electric control platform, which has an innovatively designed steering circuit, fewer but better switches, multiple functions (such as ① light indication to start up and speed up, ② stop at a fixed low speed, ③ temporary correction of vehicle state, ④ emergency stop in case of an accident; ⑤ control bus connection method, and ⑥ supply of alternating current (AC)), informationalized battery state and simple artificial intelligent circuit.

The dual-function electric stair-climbing vehicle capable of transporting goods and assisting people comprises the vehicle body, the rotating legs, the saddle, the front of the vehicle and the electric control platform, and further comprises a control bus, anti-collision structures, a slide rail, a lithium battery box, a rear electrical box and a direct current (DC) output socket, wherein the electric control platform is arranged on the front of the vehicle; the front of the vehicle is connected with the slide rail; the saddle is also connected with the slide rail; various electric control elements are mounted on the platform; and the control bus passes through a rear hole of a square pipe of the front of the vehicle.

Figure 7:
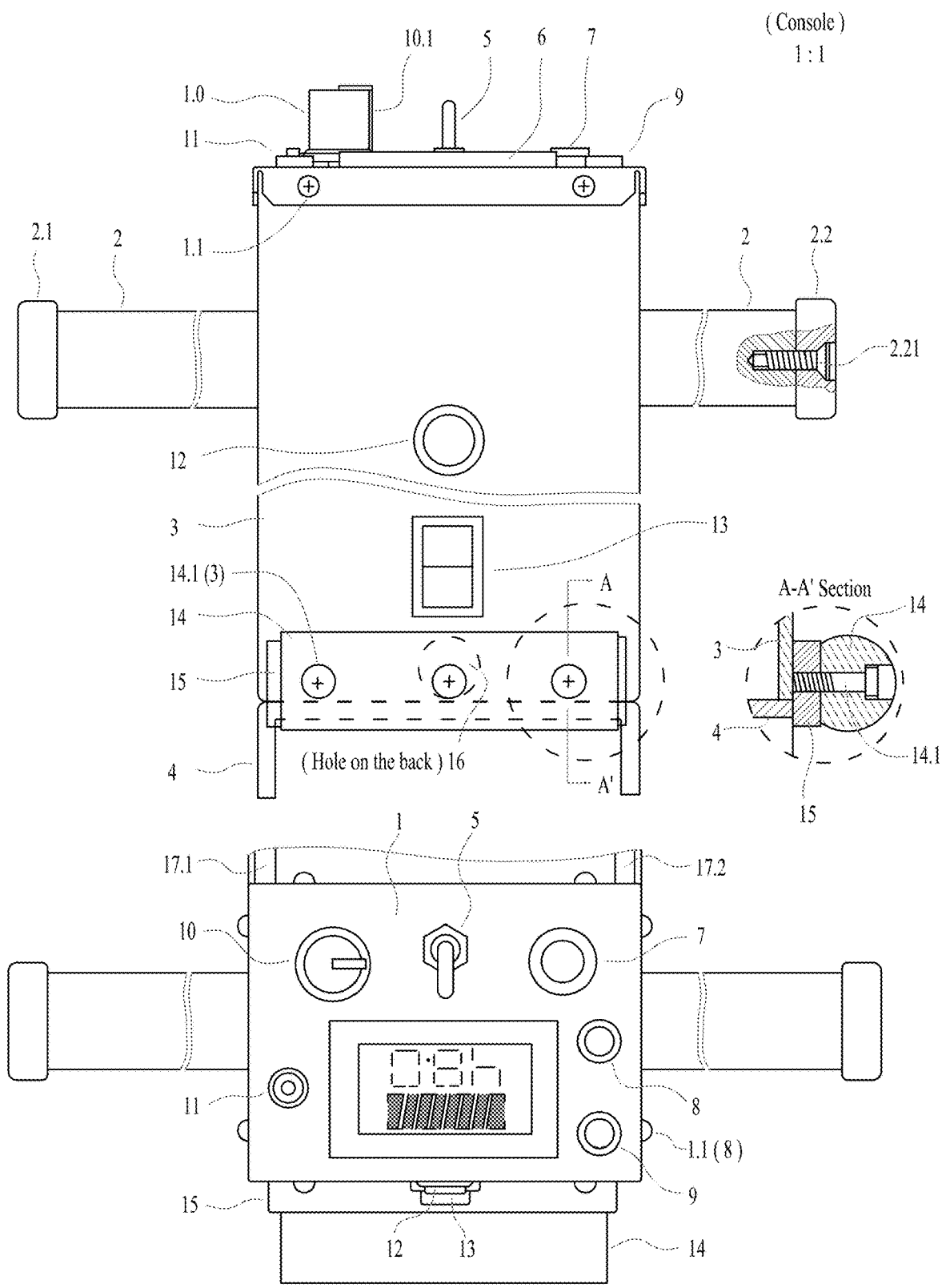
FIG. 7 is a structural schematic diagram of a control platform and a flat square pipe supporting the platform.

A power supply electric-door lock is located on the left side of a rear electrical box (FIG. 3: 8.2) of the vehicle. A section of reformed channel steel is welded at the upper end of a lifting column under the saddle, inclined at 20° and fixed with reinforcing ribs; and a section of square pipe is welded above the front of the channel steel (FIG. 3: 2, 2.1, 3, 3.00). A section of solid aluminum rod horizontally penetrates the upper part of the square pipe to serve as the front handle (FIG. 2: 2.2 and FIG. 7: 2), which can slide left and right and can give way to make a turn. Two ends of the aluminum rod are provided with stoppers (FIG. 2: 2.21, 2.22; and FIG. 7: 2, 2.1, 2.2). A stainless-steel cover plate is fixed at the top of the square pipe with self-tapping screws to serve as a switch platform, on which various control elements (FIG. 2 and FIG. 3: 2.10; and FIG. 7: 1) are mounted. A 48 V lithium battery power and voltage display is mounted at the center of the front of the switch platform, wherein the display has the smallest dimension in China at present (FIG. 2 and FIG. 3: 2.14; and FIG. 7: 6). Two LED indicator lights are mounted on the left of the display, wherein the front one is a red light for warning to reverse downstairs and the rear one is a green safety switch light. The green light turns on and off synchronously with a safety switch (FIG. 2 and FIG. 3: 2.12, 2.121; and FIG. 7: 9, 8). A button switch for controlling the start or stop of the whole vehicle, with a fast start warning red light and without self-locking function, is arranged behind the green light (FIG. 2: 2.13; and FIG. 7: 7). When riding, people can start the vehicle immediately by catching the front handles with four fingers and pressing the switch with the thumb, and can enter into a parking program by releasing the switch. It will be written in detail later. A miniature button correction switch without light and self-locking function is mounted on the right of the display (FIG. 2 and FIG. 3: 2.16; and FIG. 7: 11).

If the rotating legs do not stop within a specified angle range and it is too late to adjust positions of proximity switches, the direction can be corrected visually first; a stairs-up and stairs-down selection switch is used for cooperation; and a correction button switch is clicked to correct errors in a forward or reverse direction, so that the stopping angles of the rotating legs reach the range. The range is: rear small wheels of the rotating legs are off the ground, and front small wheels are higher than stair steps (FIG. 3: 9.1, 9.2). A knob of a stepless speed regulation potentiometer, with a green convex strip for increasing the handfeel of angle, is arranged behind the correction switch (FIG. 2: 2.15; and FIG. 7: 10, 10.1). The knob can be turned counterclockwise to the end to turn off the switch (FIG. 16: 14$k$) carried, and enter into a fixed low speed substage of the stair-climbing vehicle, which is set as a fixed speed approved by the buyer. The potentiometer switch can be turned off to turn off the red lights of two start-stop switches (FIG. 2 and FIG. 3: 2.13, 2.17; and FIG. 7: 7, 12). Actually, a potentiometer has reached the fixed low speed before turning to the end, but the switch must be turned off conveniently. When the knob turns clockwise to enter into a fast stepless speed regulation substage, the switch 14$k$ must be turned on, and the warning red lights carried by the two start-stop button switches will be turned on. A toggle safety switch is arranged just behind the power and voltage display (FIG. 2: 2.11; and FIG. 7: 5). On the premise of unlocking the electric door lock, the switch is toggled forward; the only green light on the switch platform will be turned on (FIG. 2: 2.121; and FIG. 7: 8); and the stair-climbing vehicle enters into a standby state. People can ride and stop the vehicle by pressing or releasing the start-stop button switches (FIG. 2: 2.13; and FIG. 7: 7). Under special circumstances, if other switches are out of service and people cannot stop riding, the vehicle can be stopped by toggling the safety switch backward. A rocker switch for selecting to go up and downstairs is mounted below a front panel of the square pipe. A button switch with a red light and a self-locking function in charge of going downstairs is arranged at the middle of the square pipe (FIG. 7: 13, 12).

3. Structure of Slide Rail:

The dual-function electric stair-climbing vehicle capable of transporting goods and assisting people further comprises the slide rail, wherein the slide rail is connected with the vehicle body and also connected with the saddle, the front of the vehicle and the electric control platform; the slide rail comprises a flat square pipe, a flat steel plate and sliding chutes; wide edges of the flat steel plate are inserted in the sliding chutes; and the sliding chutes are welded below the vehicle body.

Figure 10:
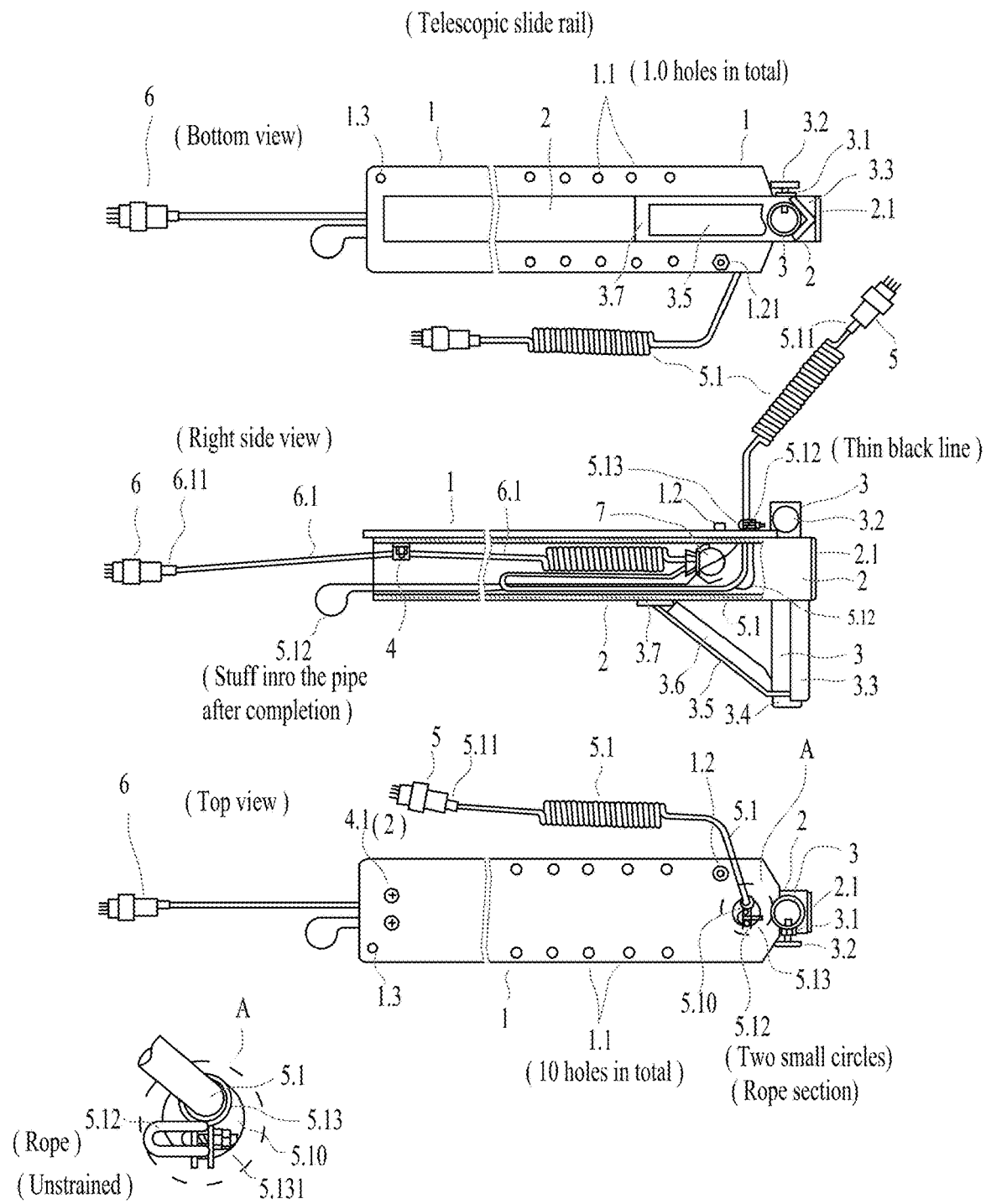
FIG. 10 is a schematic diagram of a mounting mode of a control bus.
Figure 11:
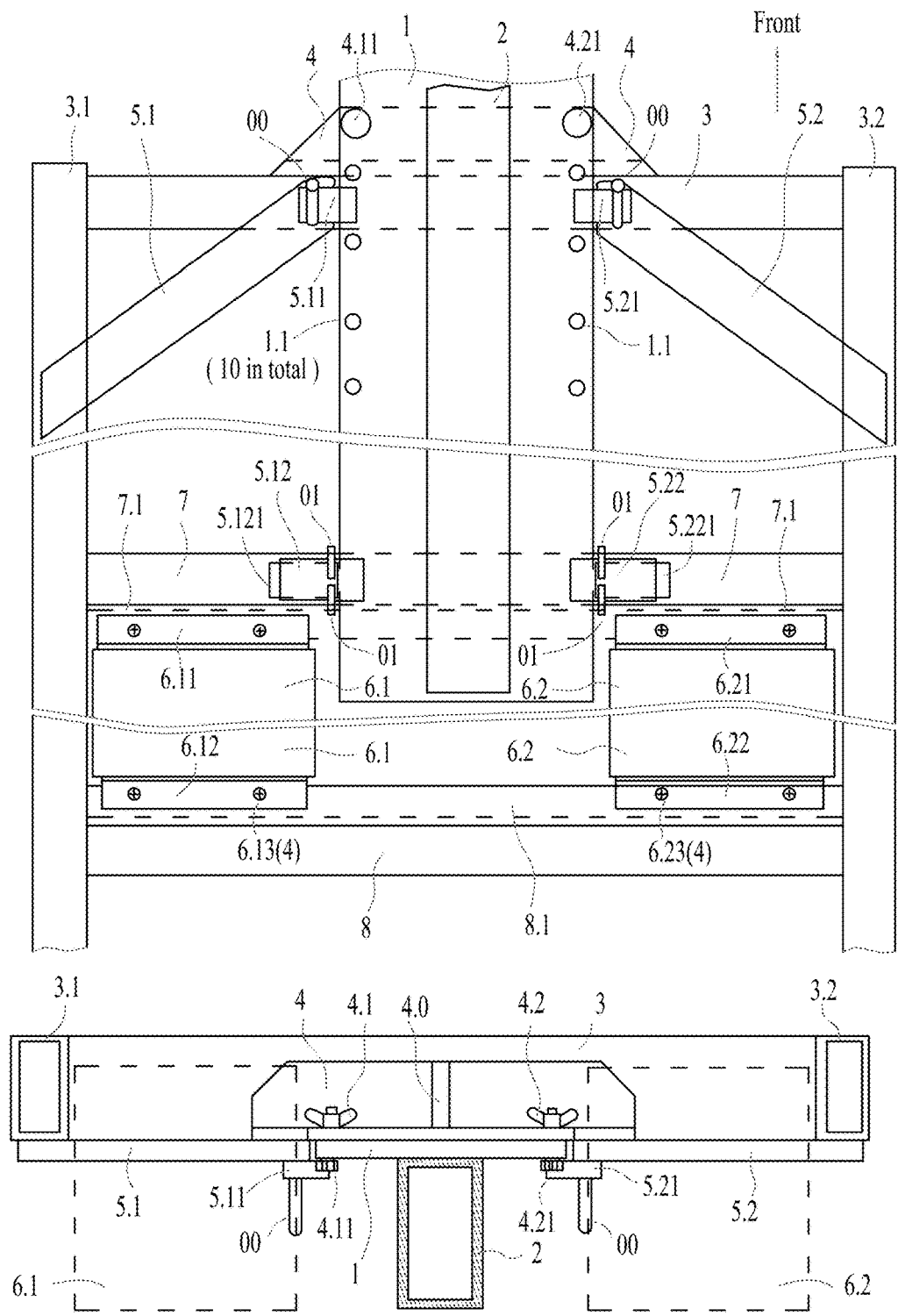
FIG. 11 is a schematic diagram of a sliding structure of a telescopic slide rail and a position of a battery box.

The slide rail capable of moving back and forth is formed by welding a flat steel plate (100×5×L mm) on a flat square pipe (60×40×L mm) (FIG. 2 and FIG. 3: 4.1, 42; FIG. 10: 1, 2). Wide edges of two sides of the steel plate are inserted in the sliding chutes; and the sliding chutes are welded under first and third transverse frames (FIG. 11: 5.11, 5.21, 5.12, 5.22; corresponding to backing plates 5.1, 5.2, 5.121, 5.221) behind the saddle by using two groups of small supporting plate structures on the front and rear, wherein each group is composed of two small supporting plate structures on the left and right. The slide rail is limited to the left and right, and can be adjusted by sliding back and forth. Two M6 big head screws are inserted into holes of a positioning structure, and then are tightened with two wing nuts (FIG. 11: 4.1, 4.11, 4.2, 4.21). Ten positioning holes (FIG. 10: 1.1; and FIG. 11: 1.1) are formed in the flat steel plate of the slide rail; and the positioning structure is provided with two holes (FIG. 12A: 3.1, 32), which can be selected for positioning. It is better to position the slide rail in the rear when the floor is narrow. The positioning structure has an anti-collision force transmission function as follows: the force applied to the steel plate of the slide rail is transmitted to the positioning structure through two big head screws; the force is transmitted to left and right flat iron inclined handles having the thickness of 6 mm by the positioning structure, and then is transmitted to left and right straight frames (FIG. 11: 4, 5.1, 5.2, 3.1, 3.2); and thus the impact force is dispersed to the whole vehicle without damaging a certain part and component.

4. Mounting Mode of Control Bus in Square Pipe:

The dual-function electric stair-climbing vehicle capable of transporting goods and assisting people has the innovatively designed steering circuit and the function ⑤ of a control bus connection method, wherein the control bus goes out from the rear hole of the square pipe of the front of the vehicle, is connected with the socket on the rear channel steel of the saddle, and then is connected with a spiral bus; a straight section is penetrated into the flat square pipe of the slide rail and is connected with another spiral bus in the pipe; an aviation plug of another spiral bus extending from the back of the square pipe is inserted in the front part of the electrical box; and the control bus is a finished product purchased or is customized from the factory.

Figure 4:
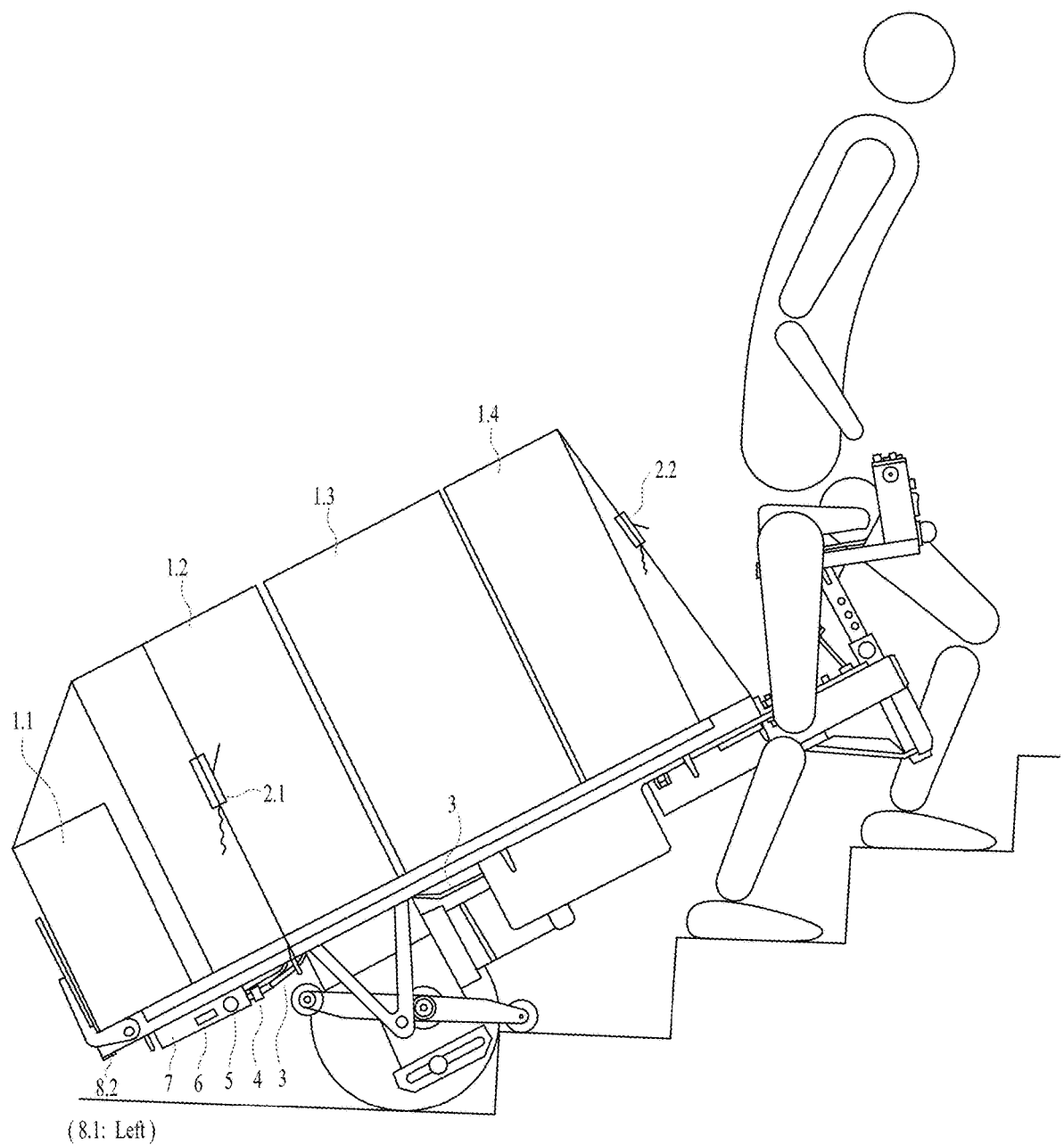
FIG. 4 is a schematic diagram of people carrying goods (multiple boxes in bulk) and riding.

The control bus runs out of a hole (FIG. 2: 2.100; and FIG. 7: 16) behind the square pipe in the front of the vehicle, is connected to the aviation plug and socket (FIG. 2 and FIG. 3: 8.52) behind the saddle, and then is connected to an inlet of the square pipe of the slide rail by using a spiral bus (FIG. 2 and FIG. 3: 8.53, 8.6; and FIG. 10: 5.1, 5.10). The spiral bus has a long straight section, can run out of an outlet behind the square pipe about 150 mm, is welded with corresponding colored wires of another spiral bus (FIG. 10: 6.1) one by one, and is sheathed with a small plastic pipe. All joints are tied into a package (FIG. 10: middle figure: 7) with an electrical adhesive tape. Before the straight part of a bus 5.1 in FIG. 10 is inserted into the square pipe, two heads of a chemical fiber rope should be brought in at the same time by a method that the head of the bus and the two heads at the two ends of the rope are tied together, wrapped with an adhesive tape, then inserted into the pipe, and then extended out of the pipe for use. The rope should be long enough but not too long. The two heads of the rope are crossed to tie a wire package; and the rope is used as a loop. The annular end of the rope is sleeved on the screw of a wire clamp; the wire clamp is clamped on the control bus outside the pipe (FIG. 10: middle figure: 5.13, 5.12 and figure A: 5.13, 5.12; and FIG. 12: E); the wire package is pulled into the pipe by one rope; the other rope bypasses the screw and is pulled out synchronously (FIG. 12: E) until the wire package is pulled to the foremost position and the other end is tensioned synchronously. Then, the bus is clamped by the wire clamp so that the bus cannot advance and retreat at a nozzle; and a second nut is used to lock the screw of the wire clamp (FIG. 12: E). At this point, the front end is completely mounted. Then, a larger fastening clip is mounted at the upper part of the rear nozzle with a flat machine screw, so that the bus can freely stretch in a semicircular clip opening (FIG. 10: 4, 4.1); and the rope extending outside the nozzle is folded and then stuck in the nozzle with the adhesive tape to avoid falling out. At this point, the control bus is completely mounted. The aviation plug (FIG. 10: 6) of the bus extending from the square pipe is inserted in the front of the electrical box (FIG. 3: 8.51; FIG. 4: 4; and FIG. 15: 5).

5. Setting Mode of Lifting Force for Assisting People:

The lifting force is set as 30-40 kg; during setting, the vehicle leans on the stairs, with the rear of the vehicle resting on a weight scale, supported by channel steel; one person controls the vehicle to make big wheels fly up, while the other one reads the weight scale; the reading is multiplied by a coefficient given by the factory to obtain the lifting force; and positions of containers in the vehicle or goods in the containers can be replaced to change the readings.

The stair-climbing vehicle can carry about 120-150 kg of goods and assist about 30-40 kg for people. When setting the lifting force in advance, the saddle is stretched and adjusted to an actual riding position of people and stays back as far as possible so that the vehicle is easy to make a turn. Then, the vehicle is filled with goods and leans against the stairs; a transverse frame of the rear of the vehicle is placed on a household scale; and a section of channel steel is placed (FIG. 3: 10, 10.1). The first step is as follows: (1) The electric door lock is unlocked; and a yellow information light of the display on the switch platform is on. (2) One person stands on the stairs above the control platform and turns on the safety switch. (3) The speed regulation knob switch (FIG. 2: 2.15) is turned off; the fixed low speed is selected; and the switch platform has no red light. (4) The correction button switch is rapidly clicked several times so that big wheels slowly lift off the ground to stop the vehicle, and the time of the big wheels lifting off the ground is prolonged by a turbine damping brake. (5) The reading of the scale is checked by another person; the reading is multiplied by a fixed coefficient provided by the factory to obtain the lifting force for people under this load; and the reading of the scale can be changed by changing the position sequence of various containers 1.1-1.4 in FIG. 3 or the goods in the containers, and then is multiplied by the coefficient to reach about 30-40 kg. The second step is as follows: (1) The person selects stairs-down by the stairs-up and stairs-down selection switch (FIG. 7: 13). (2) The person stands on the same spot and clicks the correction button so that the big wheels fall to the ground. (3) The correction button is clicked again so that the small wheels of the rotating legs are slightly away from the stair steps. (4) The reading of the scale is checked by another person, which should be about 3-6 kg; and the reading can be changed by moving the goods from both sides to the center or from the center to both sides. The second step will affect the first step; and the first step can be revised repeatedly. The setting can be easily mastered by repeating the steps several times and practicing several times. The purpose of the second step is that when the big wheels land and the small wheels fly up, the saddle still has a small lifting force to support people, so that the saddle does not droop, and the saddle does not beat the buttocks of people when assisting people to lift every time.

6. Adjustment Mode of Saddle:

①As shown in FIG. 3, the bicycle saddle can be adjusted to tilt immediately after setting the lifting force, which is subject to trial sitting of people. The height of the saddle is controlled by cooperating the first transverse frame of the frame with people; and as shown in FIG. 4, the first transverse frame is flush with the back-bend parts of knees. It is better to lean the saddle back.

Figure 6:
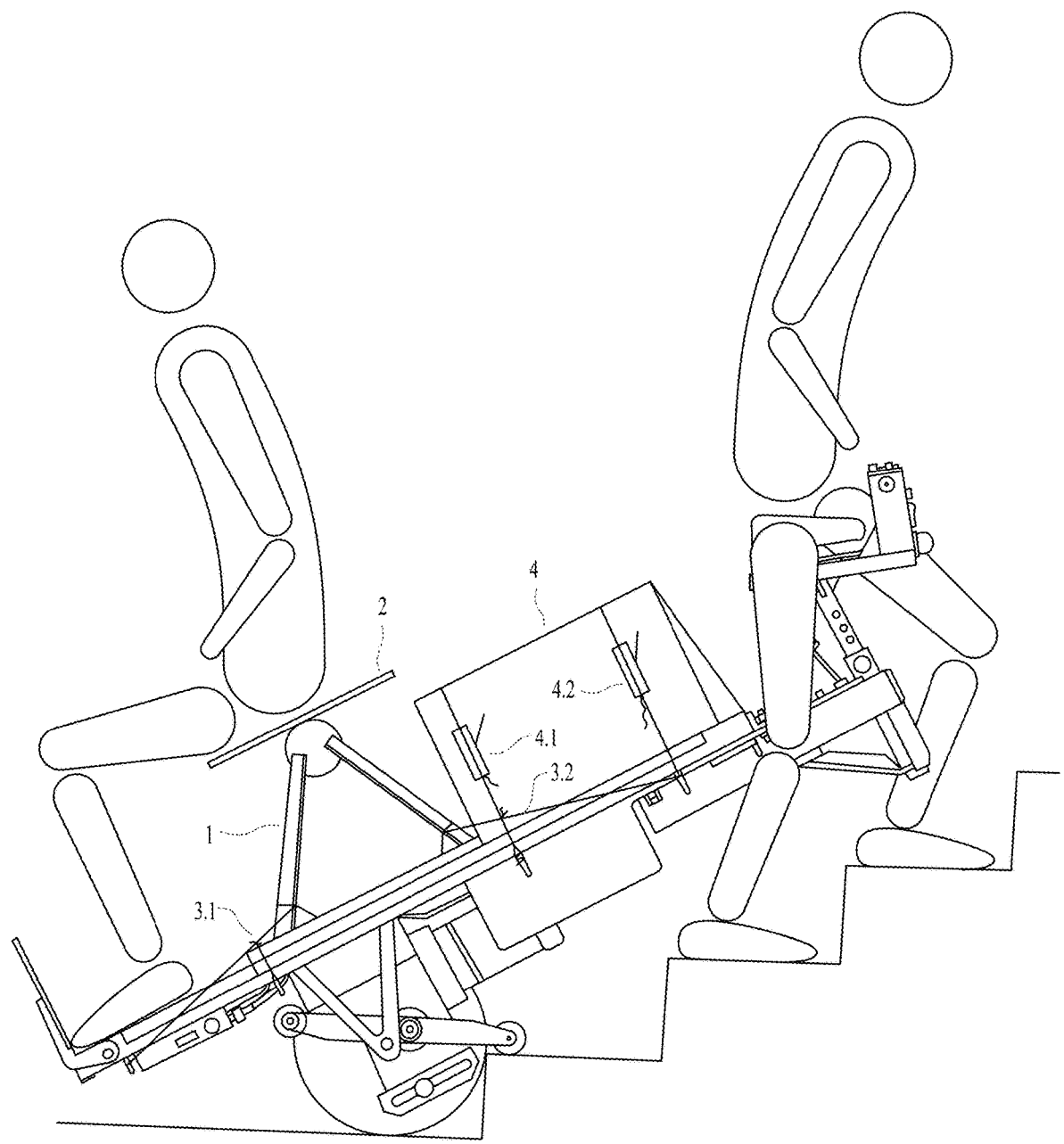
FIG. 6 is a schematic diagram of people carrying people (and a small amount of goods) and riding.

②As shown in FIG. 6, a seat frame for an occupant is first fixed in a proper position with ropes; a seat plate is swingable (FIG. 6: 1, 2, 3.1, 3.2); the occupant needs to move the body with the change of the angle of the vehicle at any time and keep balance with feet.

Figure 8:
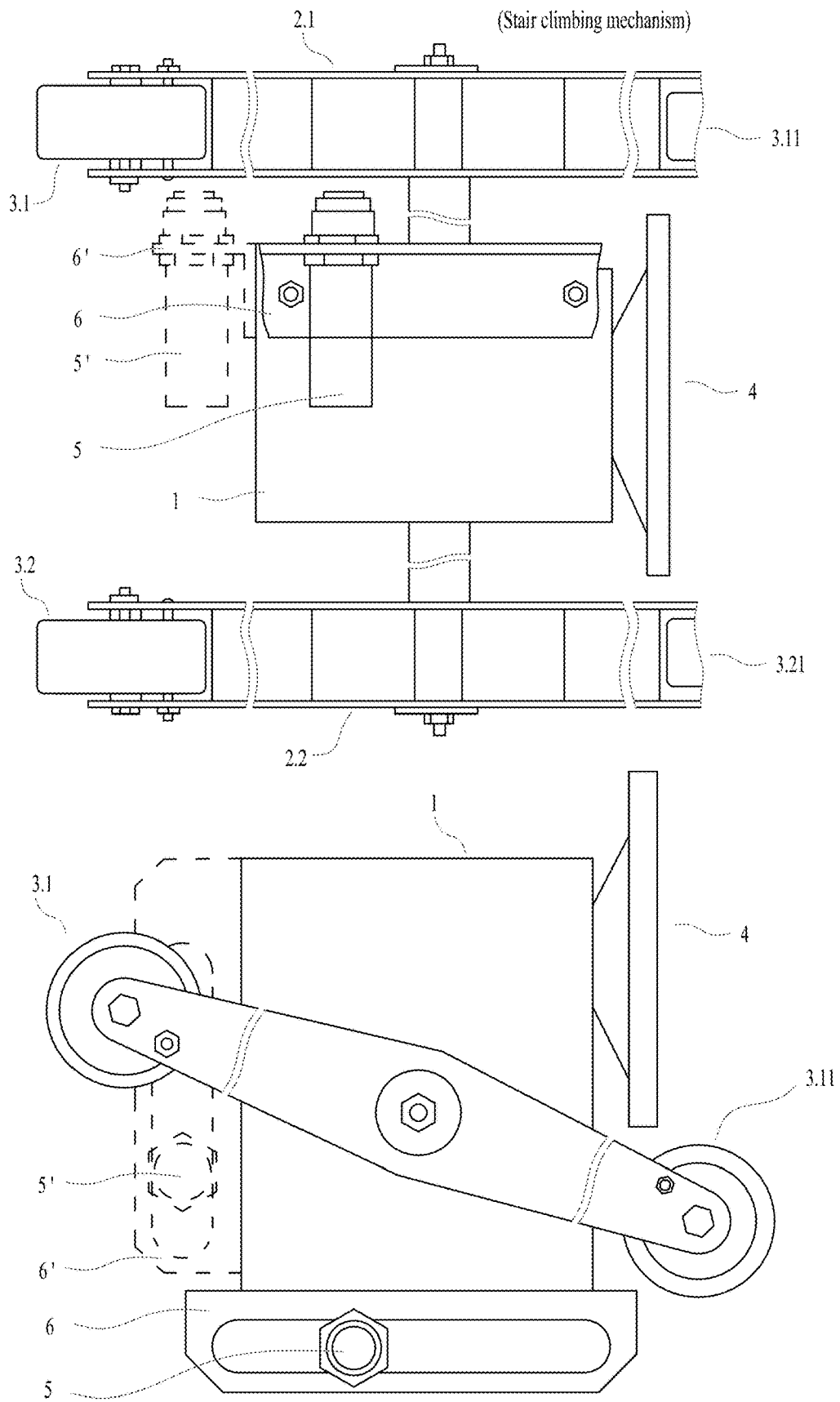
FIG. 8 is a schematic diagram of the mounting of rotating legs and proximity switches in a walking mechanism.

7. Setting of Stopping Angles of Rotating Legs:

Because a cyclist can only look at the front when facing forward to ride, and can only look at the back after stopping, at most half of the stopping angles of the rotating legs meet restarting requirements according to the probability. Artificial correction is time consuming, so it is necessary to mount an automatic device. Therefore, proximity switch structures (FIG. 8: 5, 6, 5', 6') are adopted, wherein 5' and 6' are standby mounting positions. The setting process is as follows: ① 120-150 kg of goods are loaded in advance. ② The speed regulation knob switch is turned off; a slow substage is selected; the person stands on the flat ground and lifts the vehicle until the rear of the vehicle touches the ground, and then clicks a start switch once (FIG. 2: 2.13), so that the vehicle moves one step forward and the proximity switches automatically turn off to stop the vehicle; the stopping positions of the rotating legs are checked by a cooperation person; and then the positions of the proximity switches are adjusted back and forth. ③ The above operations are repeated until the rear small wheels of the rotating legs are off the ground when the vehicle touches the ground and is inclined, and the front small wheels are higher than the estimated height of the stair steps. People go upstairs again to recheck whether the vehicle is qualified.

Figure 9:
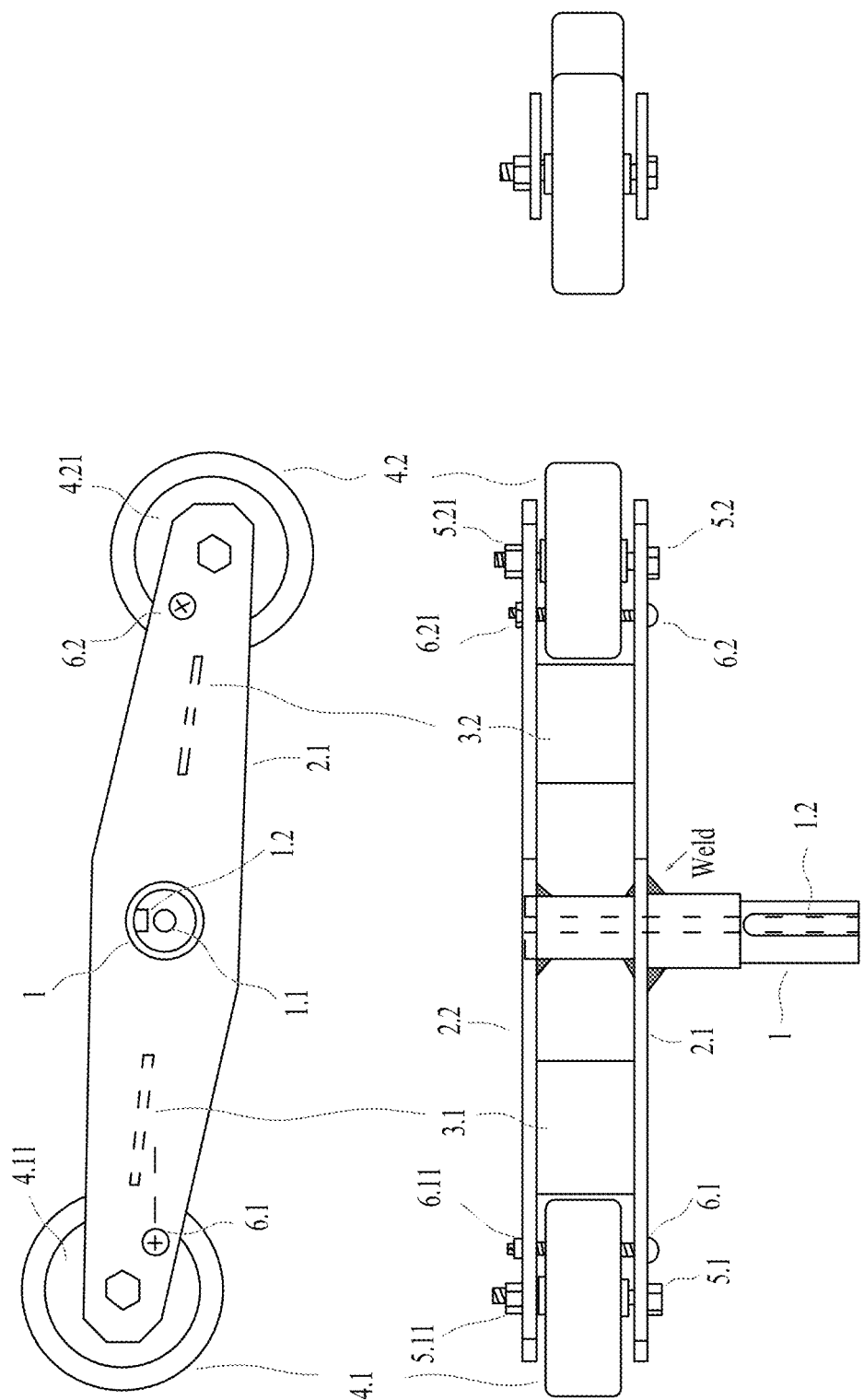
FIG. 9 is a structural diagram of rotating legs.

8. Mode for Assisting People with Horizontal Thrust:

The stair-climbing vehicle adopts "Rotating Legs of Electric Stair-climbing Vehicle with Horizontal Thrust", and comprises soft rubber rolling wheels (FIG. 9: 4.11, 4.21; 4.1, 4.2) with metal or nylon hubs, which are tightened by nuts after penetrating two long side plates and the hubs (FIG. 9: 6.1, 6.2; 2.1, 2.2; 4.11, 4.21) with screws (6.11, 6.21); when climbing the stairs, the rolling wheels cannot rotate and roll automatically [the rotating legs adopt structures and drawings as shown in "Rotating Legs of Electric Stair-climbing Vehicle with Horizontal Thrust" additionally created by applicants of the present invention, which has the prior application number in China (201910474294.4) and the reversed application number (202010422131.4); and small rolling wheels cannot rotate and roll automatically so that the small rubber rolling wheels with appropriate hardness can be selected to produce relatively great grip. When the rotating legs rotate backward, the whole vehicle has a reliable forward thrust in the horizontal direction, which can reduce the physical strength of the ride man again. This is another patent-pending supporting invention of the applicants.

9. Mode for People to get On and Off:

People should get on and off the vehicle on flat ground. If a person gets on the vehicle from the left of the vehicle, the front handle is pulled out to the left first; then the saddle is lowered with the right hand; the person conveniently faces the left and gets on the front handle pulled out, steadily stands on the ground by the left leg, holds the longer left front handle under the middle part with the left hand, keeps pressing the saddle with the right hand, lifts up the right leg to cross the front of the vehicle and land on the right, releases the right hand, and sits on the saddle; the left front handle is retracted halfway; and the person can walk on the flat ground by holding the front handles with both hands and lifting the front of the vehicle, and step on the stairs to prepare to ride upstairs. Similarly, the person can get on the vehicle from the right. The person can get off the vehicle in a reverse order.

10. Mode for Using Stair-Climbing Vehicle to go Upstairs:

The dual-function electric stair-climbing vehicle capable of transporting goods and assisting people has the innovatively designed steering circuit and the function ① of light indication to start up and speed up, wherein red, green and yellow lights indicate before starting to ride; when the speed regulation knob is in a fast substage or the switch is pressed to choose to go downstairs and reverse, if the red light is on, the vehicle is stopped at red light according to the traffic rules; if only the yellow or green light is on, the vehicle is started to go upstairs slowly; and if speed-up is required, the speed regulation knob can be turned.

The dual-function electric stair-climbing vehicle capable of transporting goods and assisting people has the innovatively designed steering circuit and the function ② of stop at a fixed low speed, wherein positions of proximity switches should be adjusted in advance so that the front small wheels of the rotating legs are higher than an estimated height of the stair steps during normal stopping; to stop normally when climbing the stairs, the knob switch should be turned off first to enter into a fixed slow speed, then the thumb of the right hand for pressing the switch is released, and then the power-off is completed by the proximity switches; and the brake is damped by a worm gearbox.

Figure 5:
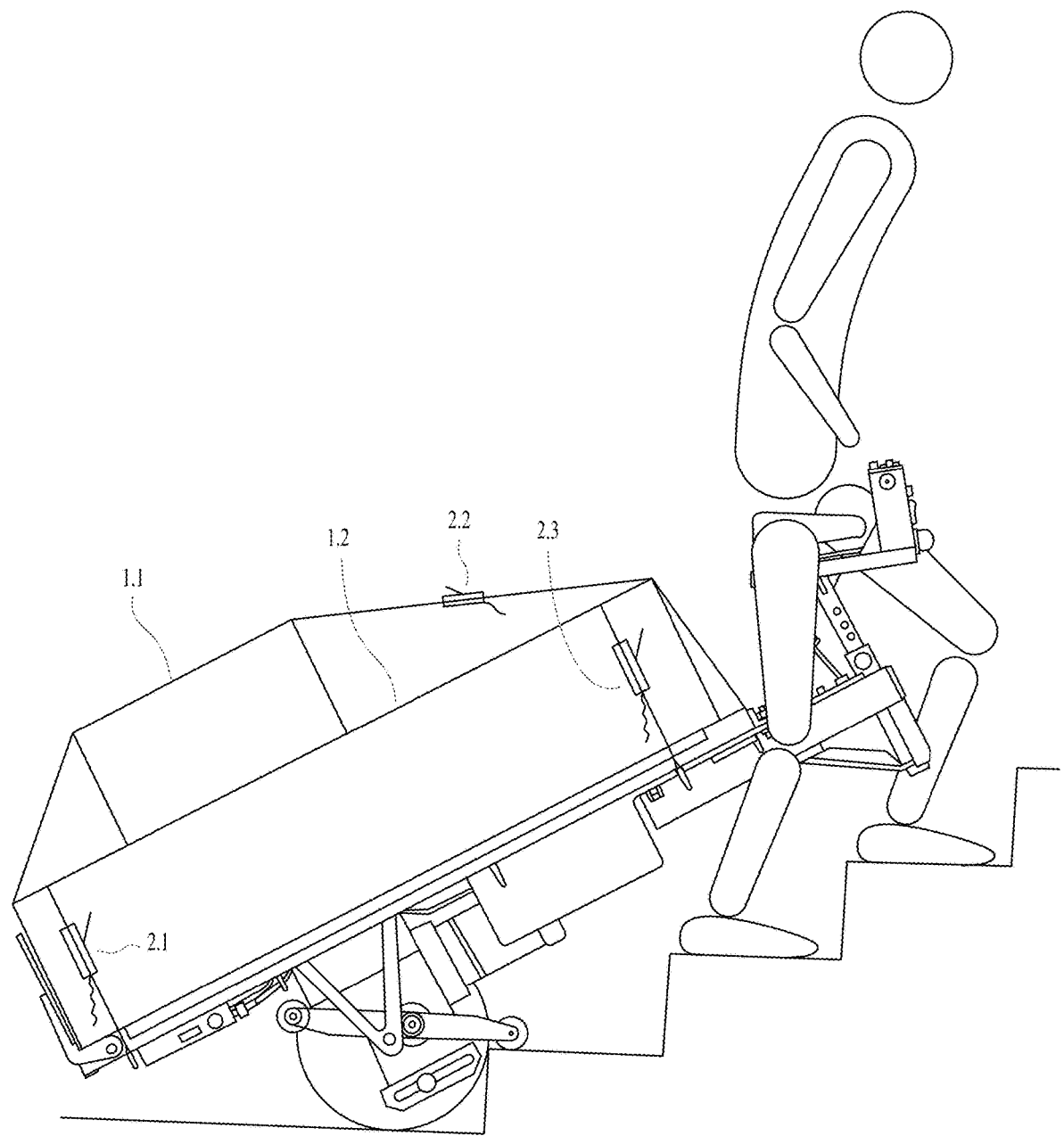
FIG. 5 is a schematic diagram of people carrying goods (large and long pieces) and riding.

The dual-function electric stair-climbing vehicle capable of transporting goods and assisting people has the innovatively designed steering circuit and the function ③ of temporary correction of vehicle state, wherein the person unlocks the electric door lock first, then gets on the stair-climbing vehicle, and immediately checks static angles of the rotating legs before starting the vehicle. If the static angles of the rotating legs are misaligned, the person should turn on the safety switch, click the correction switch by cooperating with a switch for selecting forward-backward rotation to go upstairs or downstairs so that the rotating legs rotate forward or backward to reach the set range, and then turn off the safety switch. At the moment, the person can hold the front handles to go upstairs, make the big wheel lean against a first stair step (FIG. 4, FIG. 5 and FIG. 6), and turn on the safety switch again. The person should check the switch platform first. If the green light is on, the yellow power and voltage display is on, but all the red lights are off, the person can ride upstairs. If the person finds that the red light in an upper left corner is on (FIG. 2: 2.12; FIG. 7: 9), it indicates that the person selects to reverse and go downstairs, and the start button switch cannot be pressed to go upstairs, otherwise a major accident will happen. In another case, if the stairs-up and stairs-down switch is selected correctly, the red light in the upper left corner is off, but the red light of the start-stop switch is on (FIG. 2: 2.13; and FIG. 7: 7), it indicates that the speed regulation knob is in a fast substage and the vehicle should not be started; and the speed regulation knob should be turned counterclockwise to the end immediately, thereby turning off the potentiometer switch to turn off the red light. At this point, only the green lights and the yellow lights are on (FIG. 2: 2.121, 2.14; and FIG. 7: 8, 6), the vehicle can be started normally to go upstairs. The vehicle is used based on the traffic rule of stopping at red light.

After checking, if the red light is off and the green light is on, the person can press a button type start-stop switch (FIG. 2: 213; and FIG. 7: 7), and the vehicle is started slowly to climb the stairs. In the whole stair-climbing process, the front handle is grasped by four fingers of the left hand; and the touch type button start-stop switch is always pressed by the thumb. If the person wants to go fast, a stepless speed regulation knob is rotated with the fingers of the left hand (FIG. 2: 2.15; and FIG. 7: 10), wherein a green convex strip on the knob can provide tactile sensation for the occupant to know the rotating angle.

The slow substage of the stair-climbing vehicle is designed at a fixed low speed; and it is safer to start, stop and go downstairs at low speed. If the vehicle is stopped at the fixed low speed, the stopping angles of the rotating legs can reach the standard stably. Another reason is that to go upstairs to rescue as soon as possible, a higher fixed low speed should be set to meet both requirements. In the circuit, resistance values R1 and R2 are selected (FIG. 16: 14R1, 15R2, R1+R2=R original).

When going upstairs fast and reaching an antepenultimate step on the upper floor, the person must start to slow down; when reaching the penultimate step, the knob switch should be turned off (FIG. 2: 2.15) to enter into the slow substage; and when lifting to the last step, i.e., the corridor for turning, the machine should be shut down in the lifting stage, the thumb of the left hand should be released, and then the proximity switches should complete the power-off, thereby damping the brake and slowly stopping the vehicle. When stopping, the following three situations may happen: ① if the vehicle is heavily loaded or the floor is narrow, the front of the vehicle will slightly hit the wall; and since an anti-collision cushion is arranged on the front of the vehicle, the person can also pull it backward properly to reduce the impact force. ② If the vehicle is lightly loaded or the floor is wide, the vehicle is stopped before the front of the vehicle reaches the wall, and the person can jack the vehicle forward with the crotch; after stopping, the front of the vehicle should turn against the wall, the front handles slide to one side for giving way; the vehicle can carefully advance and retreat when turning; and after completing the turning, the person and the vehicle stay at the first step of the stairs on the upper floor, and the above process is repeated again until they reach any floor. ③ No matter whether the vehicle is lightly loaded or heavily loaded, if the machine is shut down after missing the shutdown time during lifting, the proximity switches will not take effect until the next cycle, and the vehicle will hit the wall heavily. Although the vehicle has reinforcement measures, people should try to avoid this situation. If this situation really happens, emergency stop can be started, the safety switch is toggled backward (FIG. 7: 5), and the vehicle is pulled down manually to reduce the impact force.

11. Mode for Emergency Stop:

The dual-function electric stair-climbing vehicle capable of transporting goods and assisting people has the innovatively designed steering circuit and the function ④ of emergency stop in case of an accident, wherein when climbing the stairs fast, if a person slips, the circuit can be powered off immediately to realize emergency stop without delay of the proximity switches. If the person is stumbled or slips when climbing the stairs quickly, the human body will have a conditioned reflex that both hands will instinctively disengage from the switch and the front handles immediately, reach forward and prop up against the ground to form self-protection. In this design, at the fast substage, as long as the thumb of the left hand releases the button switch (FIG. 2: 2.13; and FIG. 7: 7), the machine can be powered off and shut down immediately so that the emergency stop can be realized without delay of the proximity switches, thereby minimizing the accidents.

12. Mode for Turning in Narrow Corridor:

When the width of a platform at the corner of stairs is greater than 1.1 m, people can ride up to the top floor without getting off. When the width is less than 1.1 m and greater than 0.9 m, people should get off and turn by a method as follows: the vehicle slowly stops on the steps by one step ahead; after getting off from the left, the person holds an inclined handle (FIG. 2: 6.1) under a first frame behind the saddle with the right hand and holds the upper part (FIG. 2: 2.10) of the square pipe in the front of the saddle with the left hand; the person briefly touches the button switch on the switch platform (FIG. 2: 2.13) once with the index finger of the left hand so that the vehicle climbs up the last step and is controlled by the proximity switches to shut down the vehicle; and after dragging forward slightly, the vehicle can turn left when the rear of the vehicle touches the ground slightly. Similarly, the person can get off from the right, and both hands are swapped left and right. When the width of the bend is less than 0.9 m, the vehicle is unavailable.

13. Anti-Collision Protection Mode:

The dual-function electric stair-climbing vehicle capable of transporting goods and assisting people comprises the anti-collision structures, wherein each anti-collision structure comprises a polyurethane anti-collision pad, a saddle solid lifting inner column, anti-collision angle steel and a flat iron inclined handle; the polyurethane anti-collision pad is arranged at the front of the vehicle; the anti-collision angle steel is welded in front of a saddle lifting outer sleeve; and the flat iron inclined handle is welded at the front lower part of a frame.

① Anti-collision of control platform and square pipe at the front of the vehicle: when going up to the corridor for turning, the vehicle will often slightly hit the wall during normal operation. When people shut down by mistake, the proximity switches will not shut down until the next step, the vehicle will hit the wall heavily. ② If the person is stumbled or slips when climbing the stairs quickly, a saddle-lifting outer sleeve may hit the stair steps heavily. As long as it is hit once, the outer sleeve can only be scrapped and replaced, and cannot be repaired, wherein the replacement workload is very heavy. ③ The battery box of the vehicle can only be hung on the left and right, with low sag, but it cannot hit the steps when climbing the stairs normally; and the battery box cannot hit the steps when the person is stumbled.

Therefore, a number of anti-collision protection measures are taken as follows:

A. Anti-collision of the front of the vehicle: a. a polyurethane anti-collision cushion (FIG. 3: 2.182; and FIG. 7: 14); b. a solid saddle-lifting inner column (FIG. 2 and FIG. 3: 3; and FIG. 12: b); c. a straight-through lifting outer sleeve with anti-collision angle steel (FIG. 2 and FIG. 3: 3.1, 3.3; and FIG. 10: 3, 3.3), wherein the traditional outer sleeve is not used due to the neck is easy to break at the junction of thick and thin parts; d. a "positioning and anti-collision structure" (FIG. 2, FIG. 3: 5.1; FIG. 11: 4; and FIG. 12: A) is arranged on the first transverse frame of the frame; and e. a flat iron inclined handle (FIG. 11: 5.1, 5.2) capable of dispersing the impact force. At this point, the impact force of the front of the vehicle is transmitted to the left and right straight frames, and then is dispersed by the whole vehicle, thereby keeping relatively safe.

B. Anti-collision of telescopic outer sleeve: a. angle steel added in front of the outer sleeve (FIG. 2, FIG. 3: 3.3, and FIG. 10: 3.3); and b. triangular support (FIG. 2 and FIG. 3: 3.4, 3.5, 3.6, 3.7). Here, the impact force is transmitted to the slide rail and then to the "positioning and anti-collision structure", and later is dispersed as A.

C. The outer sleeve is designed to have a certain length to prevent the outer sleeve from hitting the steps when climbing the stairs; and a fixed height should be kept under the vehicle when people fall, so as to avoid damaging the lithium battery box.

14. Battery Box Structure and Lithium Battery (FIG. 13):

Because the saddle slide rail of the stair-climbing vehicle is placed in the middle, the battery can only be divided into two same parts on the left and right. During implementation, two market finished lithium batteries 48 V×15 ah are purchased and used in parallel (FIG. 16: 2). The finished battery needs to be mounted in a special metal battery box. The structure of the battery box is as shown in FIG. 13A. A wire end of the box shall be reserved with an appropriate space by using limiting angle steel [FIG. 13B①: (1-2')]. A safety plug 2.1, a T-shaped docking port 2.2 and positive and negative wires 2.31 and 2.32 carried on the lithium battery are original. Two single-strand double-core wires led out from the electrical box 3 are connected with two battery boxes, wherein one wire 3.1 with a socket 3.2 is connected with the battery by a method as shown in FIG. B②; and the wire is protected by a plastic sleeve 3.3 at a wire inlet. The other battery is connected by the same method and is connected in parallel in the electrical box.

15. Mounting Mode of Lithium Battery Boxes:

The dual-function electric stair-climbing vehicle capable of transporting goods and assisting people further comprises the lithium battery box, wherein finished lithium batteries are purchased and put in battery boxes with appropriate spaces reversed at the rear parts of the boxes; two double-core wires led out from the electrical box are connected with two lithium battery plugs in the battery boxes by sockets; and the battery boxes are connected to the left, right, front and lower parts of the vehicle body by screws.

FIG. 14 shows the mounting mode of the right lithium battery box on the vehicle, wherein the upper figure is a bottom view; the middle figure is a right view; and the lower figure is a top view. Mounting positions of the two battery boxes on the vehicle are shown in FIG. 11: 6.1, 6.2.

16. Structure and Mounting Mode of Electrical Box:

The dual-function electric stair-climbing vehicle capable of transporting goods and assisting people further comprises the electrical box, which is a semi-built-in iron box body and is fixed at the rear of the vehicle by four screws, wherein the another spiral bus is connected to the front of the electrical box by the aviation plug socket; four holes are formed beside the socket, are sleeved with rubber protective rings; two double-core battery wires are led out from two holes; single-strand bus is penetrated into one hole; a single-strand double-core wire of the proximity switch is penetrated into one hole; and the inner diameter of the protective ring is greater than that of the wire.

The dual-function electric stair-climbing vehicle capable of transporting goods and assisting people has the innovatively designed steering circuit and the function ⑥ of supply of AC, wherein a DC output socket is arranged on the right of the electrical box, which is connected with an AC inverter when loading so as to output 220 v or 110 v AC for subsequent operations.

The electrical box is a special semi-built-in electrical box. The four sides of the chassis are 50 mm high and 35 mm exposed. Two straight sides are turned up with four right-angle flanges (width 15×height 20 mm), with holes φ4.5 mm in the middle (FIG. 15: 1.1×4). Four M4 nuts are welded at the corresponding positions of the four holes on the two transverse frames 3 and 4; four M4 screws are used to assemble and dissemble the chassis; two buckles are welded; and two locks are used (FIG. 15: 1.4, two). The control bus is connected with the aviation plug and socket (FIG. 15: 5); the single-stranded bus of a motor is inserted into a hole 5.1; two double-core wires are led out from holes 5.2 and 5.3, and are connected with two lithium batteries (FIG. 13: B① and B②); and for the proximity switches, the single-stranded double-core wire is inserted into a hole 5.4. The four holes 5.1-5.4 are all provided with rubber retainers, wherein the inner diameter of the retainers is greater than that of the wires. The chassis is placed upside down before mounting the wires (the preliminary work in the electrical box is completed first), and is turned over 180° after completing wiring, so as to tighten the four screws. The four-strand incoming and outgoing wires 5.1-5.4 of the electrical box shall be reserved in the box for easily turning over and mounting. After completing mounting, the over-long wires outside the box are stuffed into the box. When repairing, the middle of the vehicle is placed up first, a wire is pulled out, four screws are unscrewed, and the vehicle is turned over 180° for repairing.

17. Wiring Diagram of Circuit:

The design of the circuit requires fewer but better switches, multiple functions and simple artificial intelligence. Compared with the original electrical components of similar stair-climbing vehicles, only two small relays (19, 21), one miniature button switch (12), one proximity switch (10) and one negative booster (7) are added. The original start switch is replaced with two button switches (11, 13) with red lights; and the original potentiometer is replaced with a type (14R1+14K) with switch. The original potentiometer is changed into a combination of two components: one resistor and one novel potentiometer with switch. The speed regulation is divided into two substages in a new way: a fixed resistor (15R2) in charge of the slow substage; a novel potentiometer with switch (14R1+14K) in charge of fast substage of stepless speed change; R1+R2=R original; and the total resistance value is unchanged. The switch 14$k$ is in charge of the fast stairs-up and stairs-down warning red lights (red lights carried by 11 and 13), wherein the light conforms to the traffic rules: the vehicle should stop when the red light is on, and the vehicle can be slowly started when green and yellow lights are on. The knob is turned clockwise to enter into the required fast substage (14R1). (If the fast substage cannot meet the demand, the factory may be required to change the model). The vehicle should be reduced to the slow substage (15R2) before going upstairs to stop. The power-off time of the slow substage should be in a lifting stage of the last step of stairs on the floor; and the thumb is released from the start-stop button switch (11) to power off. The following procedure is operated by the proximity switches (10), and is continued to the selected position to power off, shut down and damp the brake. If the vehicle is loaded heavily or lightly, the rotating legs are stopped incorrectly, and it is too late to adjust temporarily, the correction switch can be used for temporary correction (12). It is stated in the first three lines of paragraph 9. In case of emergency, the circuit can be stopped immediately without going through the procedure of the proximity switches (10), thereby minimizing the accidents. If the red light is on when going downstairs, the slow substage (13, 15R2) should be selected before operation. As every second counts for fire rescue, a relatively fast slow substage (15R2) should be set, which is determined by the buyer in the practice and modified by the factory.

18. When going downstairs, people do not ride the vehicle, stand in front of the saddle, hold the front handles with both hands, pay attention to the red lights, and turn to the slow substage to go downstairs.

19. In subsequent use or practice, on the premise of ensuring the ability of people to control the vehicle, the lifting force for assisting people can be increased as much as possible.

20. The vehicle can also walk on the flat ground, e.g., the vehicle goes out of a transport vehicle and onto the ground, and then walks to the stairs on the first floor. The vehicle can be pushed and pulled by virtue of two big wheels.

21. The dimension (length×width×height) of the frame is about 1200×550×380 mm.

NAMES OF MARKED OBJECTS

FIG. 2 and FIG. 3

1. Bicycle saddle; 2. Reformed channel steel (80×30×L mm); 2.1. Square pipe (80×60×L×2-3 mm wall thickness); 2.10. Switch platform (See FIG. 7 below); 2.11. Safety switch (Two groups of toggle switches with four pins; 5A); 2.12. Light for warning to reverse downstairs (Red; 12 V); 2.121. Safety switch light (Green; 12 V); 2.13. Button type start-stop switch (for going upstairs) with red light (12 V light; No self-locking function; φ 12 mm); 2.14. 48 V lithium battery power and voltage display (Yellow; 48×29 mm); 2.15. Fast stepless speed regulation knob (The potentiometer has a switch for controlling the red lights carried by button switches 2.13 and 2.17); 2.16. Miniature button type correction switch (No light; No self-locking function); 2.17. Button type start-stop switch (for going downstairs) with red light (12 V light; With self-locking function; φ 12 mm); 2.171. Stairs-up and stairs-down selection switches (Two groups of rocker switches with 4-6 pins; No light; 5A); 2.181. Anti-collision cushion base iron plate (78×25×6 mm; Tapping screws M5×3); 2.182. Polyurethane anti-collision cushion (φ 25×75 mm milled to have an edge of 15 mm); 2.191. (Left) and 2.192. (Right) reinforcing ribs (3 mm thick); 2.100. Outlet behind the square pipe of the control bus (φ 12-15 mm); 2.2. Front handle (Solid hard aluminum rod capable of sliding left and right; φ 20×350 mm); 2.21. and 2.22. Polyurethane stoppers (φ 30×10 mm) (See FIG. 7 above); 3. Saddle-lifting solid inner column (φ 25×300-400 mm; See FIG. 12: B); 3.0. Positioning cavities (φ 9 mm, 5); and 3.00. Reinforcing ribs (3 mm thick).

Figure 12:
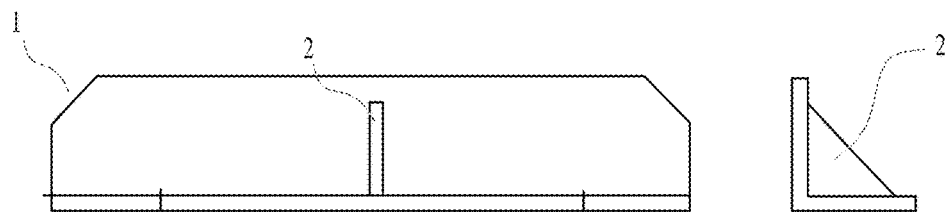
FIG. 12: A is a schematic diagram of a positioning and anti-collision structure of a slide rail.
Figure 12:
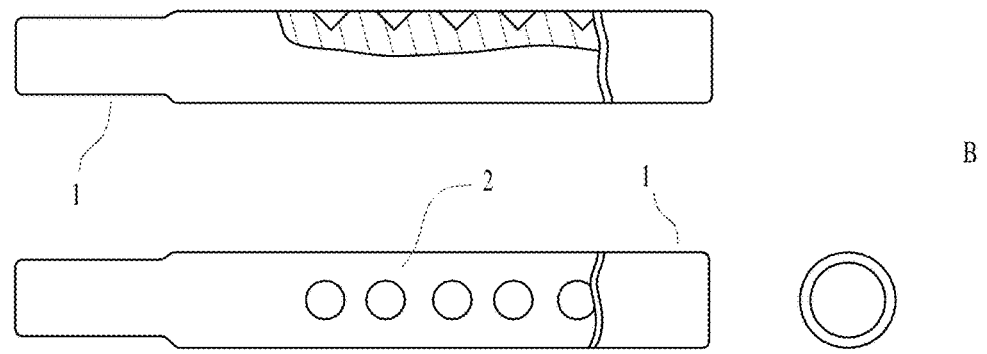
Figure 12:
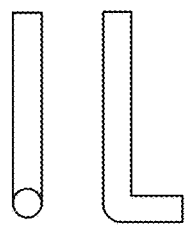
Figure 12:
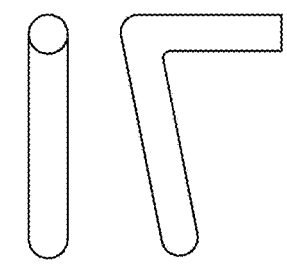
Figure 12:
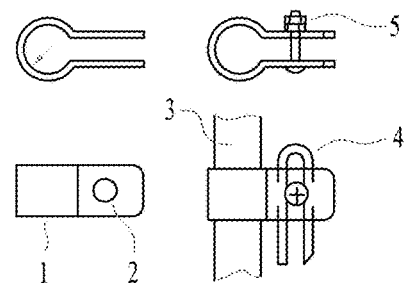

3.1. Saddle-lifting outer sleeve [φ30 (outer)×φ25 (inner)×L mm]; 3.2. Thumb screw with handle (M8×12-20 mm; Hereinafter referred to as big head screw); 3.3. Anti-collision angle steel (25×25×L mm); 3.4. Round iron cushion block (φ25±1×6-8 mm); 3.5. Bottom reinforcing rib (3 mm thick); 3.6. Vertical reinforcing rib (3 mm thick); 3.7. Reinforcing rib backing plate (3 mm thick); 4.1. Flat steel plate of slide rail (100×5×L mm); 4.2. Flat square pipe of slide rail (60×40×L×3-3.5 mm wall thickness); 4.3. Sealing iron plate (58×38×2 mm); 4.4. Positioning hole (φ 8 mm×10); 4.41. (Left) and 4.42. (Right) front support plates of the slide rail (See 11: 5.11; 5.21); 4.5. Front telescopic limit screw (hexagon socket M6×10 mm); 4.51. (Left) and 4.52. (Right) rear support plate assemblies of the slide rail (see FIG. 11: 5.12; 5.121; 5.22; 5.221; 01); 5. First transverse frame of the frame (40×20×L×2 mm); 5.1. Positioning and anti-collision structure of the slide rail (See FIG. 12A); 5.11. (Left) and 5.12. (Right) M6 wing nuts; 5.21. (Left) and 5.22. (Right) big head screws (M6×16-18 mm, 2); 6.1. (Left) and 6.2. (Right) impact force-dispersing flat iron type inclined handles (See FIG. 11: 5.1; 5.2; 6 mm thick); 7.1. (Left) and 7.2. (Right) lithium battery boxes; 8.1 Semi-built-in electrical box chassis (See FIG. 15); 8.2. 48 V power supply electric door lock (25A); 8.3. Charging socket (Video RCA, type 3A); 8.4. DC output socket (25A); 8.51. Aviation plug sockets at the front end of electrical box (15; Opening 20 mm); 8.52. Aviation plug and socket behind the saddle (15; Opening 20 mm); 8.53. Control bus (12-15 wires); 8.54. Wire of the motor; wires of left and right lithium batteries; wires of proximity switches; 8.6. Wire clamp assembly (See FIG. 10: figure A; FIG. 12: E); 9. Turbine box; 9.1. (Left) and 9.2. (Right) rotating legs; 9.3. 48 V 500-800W DC brushless speed regulation motor; 9.4. Bracket (reformed from angle iron 25×25×L mm); 9.5. Normally-closed DC proximity switch (12 V); and 10. Household scale.

10.1. Channel steel (60×40×250 mm); and 00. Rope hooks (12 in total).

FIG. 4

1.1., 1.2., 1.3. and 1.4. Containers; 2.1 and 2.2 Rope tighteners; 3. Control bus; 4. Aviation plug and socket; 5. Charging socket (Video RCA, type 3A); 6. DC output socket (25A); 7. Electrical box chassis; 8.1. and 8.2. Steel backing plate of the rear of the vehicle.

FIG. 5

1.1. and 1.2. Containers; 2.1., 2.2. and 2.3. Rope tighteners.

FIG. 6

1. Movable saddle; 2. Seat plate; 3.1. and 3.2. Positioning ropes; 4. Container; 4.1. and 4.2. Rope tighteners.

FIG. 7

1. Switch platform; 1.1. Self-tapping screws (M3×6 mm; 8); 2. Front handle [capable of sliding left and right; Hard solid aluminum rod (φ20×350 mm)]; 2.1 (Left) and 2.2 (Right) polyurethane stoppers (φ30×mm, 2); 2.21. Flat machine screws (M4×20 mm; 4); 3. Flat square pipe (80×60×L×2-3 mm wall thickness); 4. Reformed channel steel (80×30×L mm); 5. Safety switch (two groups of toggle switches with four pins; 5A); 6. 48 V lithium battery power and voltage display (yellow); 7. Button type start-stop switch (for going upstairs) (No self-locking function; With red light; 12 V; φ 12 mm); 8. Safety switch light (Green; 12 V; φ 6 mm); 9. Light for warning to reverse downstairs (Red; 12 V; (φ 6 mm); 10. Fast stepless speed regulation knob (With switch for controlling red lights of button switches 7 and 12); 10.1. Green convex strip; 11. Miniature button type correction switch (No self-locking function; φ 6 mm); 12. Button type start-stop switch (for going downstairs) (With red light; 12 V; With self-locking function; φ 12 mm); 13. Stairs-up and stairs-down selection switches (Two groups of rocker switches with 4-6 pins; 5A); 14. Polyurethane anti-collision cushion (φ 25×75 mm); 14.1. Pan head screws (M5×12-16 mm; 3); 15. Anti-collision cushion base iron plate (78×25×6 mm; Tapping screws M5×3); 16. Outlet behind the square pipe of the control bus (φ 12-15 mm) (φ 12-15 mm); 17.1. (Left) and 17.2. (Right) triangular reinforcing ribs (3 mm thick).

FIG. 8

1. Turbine box; 2.1. (Left) and 2.2. (Right) rotating leg frames; 3.1., 3.11., 3.2. and 3.21. Rolling wheels; 4. Motor connecting seat; 5. Proximity switch (DC; 12 V; Normally closed type); 6. Mounting bracket (reformed from angle iron 25×25×L mm); 5' and 6' Standby mounting positions.

FIG. 9

1. Spindle; 1.1. Spindle center hole; 1.2. Keyway; 2.1. and 2.2. Left and right side plates; 3.1. and 3.2. Reinforcing plates; 4.1. and 4.2. Rubber wheels; 4.11. and 4.21. Nylon or metal hubs; 5.1. and 5.2. Bolts; 5.11. and 5.21. Self-locking nuts; 6.1. and 6.2. Stop screws; 6.11. and 6.21. Self-locking Nuts.

FIG. 10

1. Flat steel plate (100×5×L mm); 1.1. Ten positioning holes (φ 8 mm); 1.2 Front limit screws (inner hexagon M6×10 mm); 1.21. M6 nuts; 1.3. Rear limit screw hole (φ 6.1 mm).

2. Flat square pipe (60×40×L×3-3.5 mm wall thickness); 2.1. Sealing steel plate (58×38×2 mm); 3. Saddle-lifting outer sleeve (φ30 (outer)×φ25 (inner)×L mm); 3.1. M8 nut; 3.2. Big head screw (M8×12-16 mm); 3.3. Anti-collision angle steel (25×25×L mm); 3.4. Round iron cushion block (φ 25±1×6-8 mm); 3.5. Bottom reinforcing rib (3 mm thick); 3.6. Vertical reinforcing rib (3 mm thick); 3.7. Reinforcing rib backing plate (3 mm thick); 4. Fastening clip (which is loosely assembled so that the wire can slide); 4.1. Flat machine screws (M3×10-15 mm containing nuts, 2 sets); 5. Aviation plugs behind the saddle (15; Opening 20 mm); 5.10. Wire hole (φ 10-15 mm); 5.1. Control bus (12-15 wires); 511. Plastic sleeve; 5.12. Chemical fiber rope (φ 2-3 mm); 5.13. Wire clamp (see FIG. 12: E); 5.131. Double nut-locked screw (m3×10-12 mm); 6. Aviation plugs in front of the electrical box (15; Opening 20 mm); 6.1. Control bus (12-15 wires); 6.11. Plastic sleeve; and 7. Summary wire package (See description V: 4).

FIG. 11 Bottom view of middle section of slide rail and battery box:

1. Flat steel plate of the slide rail (100×5×L mm); 1.1. Positioning holes (φ 8 mm×10); 2. Flat square pipe (60×40×L×3-3.5 mm wall thickness); 3. First transverse frame of the frame (40×20×L×wall thickness 2 mm); 3.1. and 3.2. Left and right side frames of the frame (40×20×L×2 mm wall thickness); 4. Positioning and anti-collision structure of the slide rail (reformed from angle steel 30×30×L mm); 4.1. and 4.2. Wing nuts (M6; 2); 4.11. and 4.21. Big head screws (M6×16-18 mm; 2); 5.1. and 5.2. Impact force-dispersing flat iron inclined handle (6 mm thick); 5.11. and 5.21. Right and left front support plates of the slide rail (3-6 mm thick); 5.12. and 5.22. Right and left rear support plates of the slide rail (6 mm thick); 5.121. and 5.221. Right and left rear backing plates of the slide rail (6 mm thick); 6.1. and 6.2. Right and left lithium battery boxes; 6.11., 6.12., 6.21. and 6.22. Angle iron (on the boxes) mounted and connected on the right and left lithium battery boxes (20+5×20+5×L mm); 6.13. and 6.23. Screws (M5×12 mm; 8); 7. Third transverse frame of the frame (40×20×L×2 mm wall thickness); 7.1. and 8.1. Angle iron (on the vehicle) mounted and connected on the right and left lithium battery boxes (20+5×20+5×L mm); 8. Fourth transverse frame of the frame (40×20×L×2 mm wall thickness); 00. Rope hook; and 01. Reinforcing hook (See FIG. 12: C, D).

FIG. 12 Schematic diagram of small structures:

A: Positioning and anti-collision structure of the slide rail: 1. Angle steel (30×30×L mm); 2. Reinforcing rib (3 mm thick); 3.1. and 3.2. Round positioning holes (φ 6.5 mm).

B: 1. Solid lifting column: the large diameter is about 25 mm, which is slidably matched with the outer sleeve; and the small diameter is matched with the saddle. 2. Positioning cavities (φ 9 mm; 5); 45 # steel; and heat treatment quenching and tempering for HRC at 40°±5°.

C: Strengthening hook (reformed from round steel φ 4 mm).

D: Rope hook (reformed from round steel φ 6-7 mm).

E. Wire clamp: 1. Stainless steel strip (10×1.0×L mm; the diameter of the ring is matched with the control bus); 2. Round hole (φ 3.5 mm); 3. Control bus; 4. Chemical fiber rope (φ 2-3 mm); and 5. Double nut-locked screw (M3×12 mm).

FIG. 13

A: Lithium battery box: 1. Metal trunk body (270+30×75+15×140+20×1.0+0.2 mm); 1.1. and 1.2. Angle iron (on the boxes) mounted and connected on the lithium battery boxes (20+5×20+5×L mm; welded at the specified positions on the two sides of the box body); 1.11. and 1.21. Round holes (φ 8 mm; 4 holes); 1.31. and 1.32. Wire inlets.

B①: Horizontal schematic diagram of the battery box: 1. Battery metal trunk; 1.31. Wire inlet; 1.4. Limiting angle iron (20+5×20+5×1 mm); 1.5. Screw and nut (M4×10 mm; 2 sets); 2. Finished lithium battery (48 V; 15 Ah) purchased at the market; 2.1. Safety plug; 2.2. T-shaped docking port; 2.31. and 2.32. Positive and negative wires; 3. Electrical box; 3.1. Electrical box lead-out wires; 3.2. Socket; 2'-Schematic diagram of the position of the finished lithium battery mounted in the battery box "1"; and (1-2')-Schematic diagram of the space reserved in a wire region of the battery box.

B②: Longitudinal schematic diagram of the battery box: 1. Battery metal trunk; 2. Finished lithium battery; 2.1. Safety plug; 2.2. T-shaped docking port; 3. Electrical box; 3.1. Positive and negative battery wires (single-strand double-core wires); 3.2. Socket; and 3.3. Plastic sleeve.

FIG. 14 Schematic diagram of the mounting of the right battery box:

1. Right frame of the frame (40×20×L×2 mm); 2. Third transverse frame of the frame (40×20×L×2 mm); 2.1 and 2.2 Right and left rear backing plates (6 mm thick); 2.3. and 2.4. Right and left rear support plates (6 mm thick); 01. reinforcing hooks (4 in total; See FIG. 12: C); 3. and 4. Angle iron (on the vehicle) mounted and connected on the battery boxes (20+5×20+5×L mm); 5. Fourth transverse frame of the frame (40×20×L×2 mm); 6. Slide rail steel plate (100×5×L mm); 6.1. Rear limit screw (Inner hexagon M6×10 mm); 6.11. M6 nut; 7. Flat square pipe of the slide rail (60×40×L×3-3.5 mm wall thickness); 8. Right battery box; 8.1. and 8.2. Connecting screws (M5×12 mm; 4); 8.121., 8.111., 8.221. and 8.211. M5 nuts (pre-welded at hole positions corresponding to the inner sides of the angle iron "4" and "3"; 4).

FIG. 15 Schematic diagram of semi-built-in electrical box:

1. Chassis of semi-built-in electrical box (300-20×150±10×1.0+0.2 mm; Flange 50 mm); 1.1. Square opening of the flange (width 15×depth 20 mm; 4); 1.2. Half-round head screws (M4×10; 4); 1.3. Nuts (M4; 4; Pre-welded at positions corresponding to the transverse frames "3" and "4"); 1.4. Buckles (2 sets); 2.1. and 2.2. Left and right straight frames of the frame (40×20×L×2 mm); 3. and 4. Fifth and sixth transverse frames of the frame (40×20×L×2 mm); 5. Aviation plug and socket at the front end of electrical box (15; Openings 20 mm); 5.1. Motor wire inlet (with rubber retainer); 5.2. and 5.3. Outlets of lead-out wires of left and right lithium battery electrical boxes (with rubber retainers); 5.4. Inlets of single-strand double-core wires of proximity switches (with rubber retainers); 6. Charger socket (Video RCA; type 3A); 7. 48 V power supply electric door lock (Type 25A); and 8. DC output socket (Type 25A).

FIG. 16 Wiring diagram of circuit:

1. Charger (Input 220 V AC or 110 V AC; Output 48 V DC); 2. Lithium battery (Commercial ternary lithium battery; 48 V 15 ah); 2.1. and 2.2. Left and right groups of identical lithium batteries (connected in parallel); 2.3. Charging socket (Video RCA; type 3A); 2.4. 48 V DC output socket (25A); 3. 48 V power supply electric door lock (25A); 4. 48 V DC brushless motor controlling; 5. 48 V 500-800W DC brushless speed regulation motor; 6. 48 V lithium battery power and voltage display (yellow); 7. Negative booster for converting DC 17-55 V to 12 V; 8. Safety switch (Toggle switch; two groups with 4 pins; 5A); and 9. Stairs-up and stairs-down selection switches (Rocker switches; Two groups with 4-6 pins; 5A).

10. Proximity switch (Normally-closed DC 12 V); 11. Button type start-stop switch (for going upstairs) (With red light; 12 V; No self-locking function; $\varphi$ 12 mm); 12. Miniature button type correction switch (No light; No self-locking function; $\varphi$ 6 mm); 13. Button type start-stop switch (With red light; 12 V; With self-locking function; $\varphi$ 12 mm); 14R1. Fast speed regulation potentiometer with switch (Stepless speed regulation in fast substage); 14k. Switch carried by potentiometer (Fast speed regulation substage; Automatically light on the red lights carried by two button switches "11" and "13"); 15R2. Resistor corresponding to manually set fixed low speed (Start; Stop; Reverse); 16. Safety switch LED light (Green; 12 V; $\varphi$ 6 mm); 18. and 20. Diodes (100 V; 200 ma); 19. and 21. Intermediate relays (12 V; Two groups).

What is claimed is:

1. A dual-function electric stair-climbing vehicle, comprising a vehicle body, rotating legs, a saddle, a vehicle front, first wheels and an electric control platform, wherein the rotating legs have a horizontal thrust structure; the horizontal thrust structure comprises rubber rolling wheels with hubs made of metal or nylon, which are tightened by nuts after penetrating two long side plates and the hubs with screws; when climbing stairs, the rubber rolling wheels cannot rotate and roll automatically; and the rubber rolling wheels are used for production of grip, so that the dual-function electric stair-climbing vehicle has a forward thrust in a horizontal direction;

the rubber rolling wheels comprise second wheels at front ends of the rotating legs; the second wheels are configured to serve as a temporary central fulcrum and form a seesaw principle with a center of gravity of the dual-function electric stair-climbing vehicle and a center of gravity of an occupant when the rotating legs climb up the stairs, thereby having a lifting force adapted to be applied to the occupant; and the lifting force is set as 30-40 kg; during setting, the vehicle leans on the stairs, with a rear of the dual-function electric stair-climbing vehicle resting on a weight scale, supported by channel steel; the dual-function electric stair-climbing vehicle is configured to be controlled to make the first wheels fly up, while the weight scale is configured to give a reading; the reading is multiplied by a predetermined coefficient to obtain the lifting force; and positions of containers in the dual-function electric stair-climbing vehicle or goods in the containers are replaceable to change the reading.

2. The dual-function electric stair-climbing vehicle according to claim 1, wherein tilting, lifting and back-and-forth movements of the saddle are adjustable.

3. The dual-function electric stair-climbing vehicle according to claim 1, further comprising a control bus, anti-collision structures, a slide rail, a lithium battery box, an electrical box and a direct current (DC) output socket, wherein the electrical box is fixed at the rear of the dual-function electric stair-climbing vehicle; the electric control platform is arranged on the vehicle front; the vehicle front is connected with the slide rail; the saddle is also connected with the slide rail; electric control elements are mounted on the electric control platform; and the control bus passes through a rear hole of a square pipe of the vehicle front.

4. The dual-function electric stair-climbing vehicle according to claim 3, wherein each of the anti-collision structures comprises a polyurethane anti-collision pad, a saddle solid lifting inner column, anti-collision angle steel and a flat iron inclined handle; the polyurethane anti-collision pad is arranged at the vehicle front; the anti-collision angle steel is welded in a front of a saddle lifting outer sleeve; and the flat iron inclined handle is welded at a front lower part of a frame.

5. The dual-function electric stair-climbing vehicle according to claim 3, wherein the slide rail is connected with the vehicle body and also connected with the saddle, the vehicle front and the electric control platform; the slide rail comprises a flat square pipe, a flat steel plate and sliding chutes; wide edges of the flat steel plate are inserted in the sliding chutes; and the sliding chutes are welded below the vehicle body.

6. The dual-function electric stair-climbing vehicle according to claim 3, wherein finished lithium batteries are purchased and put in the lithium battery box with spaces reversed at rear parts of the lithium battery box; two double-core wires led out from the electrical box are connected with two lithium battery plugs in the lithium battery box by sockets; and the lithium battery box is connected to left, right, front and lower parts of the vehicle body by screws.

\* \* \* \* \*